US012748579B2

(12) United States Patent
Wittstock et al.

(10) Patent No.: US 12,748,579 B2

(45) Date of Patent: Sep. 29, 2026

(54) IN-APPLICATION DYNAMIC USER INTERFACE RENDERING

(71) Applicant: Airship Group, Inc., Portland, OR (US)

(72) Inventors: Nathan Mark Wittstock, Portland, OR (US); Ryan Lepinski, Portland, OR (US); Meghan Suslak, Portland, OR (US); Jeffrey A Towle, Portland, OR (US); Pascal Le Levier, Paris (FR); Michael James Herrick, Portland, OR (US)

(73) Assignee: Airship Group, Inc., Portland, OR (US)

( * ) Notice: Subject to any disclaimer, the term of this patent is extended or adjusted under 35 U.S.C. 154(b) by 280 days.

(21) Appl. No.: 18/677,710

(22) Filed: May 29, 2024

(65) Prior Publication Data

US 2024/0403008 A1 Dec. 5, 2024

Related U.S. Application Data

(60) Provisional application No. 63/470,411, filed on Jun. 1, 2023.

(51) Int. Cl.

*G06F 8/38* (2018.01)

*G06F 3/048* (2013.01)

(Continued)

(52) U.S. Cl.

CPC ................ *G06F 8/38* (2013.01); *G06F 3/048* (2013.01); *G06F 8/41* (2013.01); *G06F 8/61* (2013.01);

(Continued)

(58) Field of Classification Search

CPC .................................. G06F 8/38; G06F 9/451

See application file for complete search history.

(56) References Cited

U.S. PATENT DOCUMENTS

2020/0233731 A1 * 7/2020 Mehlmauer ........ G06Q 30/0277

2020/0298125 A1 9/2020 Stroud (Continued)

FOREIGN PATENT DOCUMENTS

CA 2910868 A1 * 11/2014 ......... G06Q 30/0208

KR 10-2021-0015428 A 2/2021

OTHER PUBLICATIONS

Gao, Cuiyun, et al., IntelliAd: Assisting Mobile App Developers in Measuring Ad Costs Automatically, IEEE/ACM 39th IEEE International Conference on Software Engineering Companion, 2017, 3 pages, [retrieved on Apr. 23, 2026], Retrieved from the Internet: <URL:http://dl.acm.org/>.*

(Continued)

*Primary Examiner* — Geoffrey R St Leger

(74) *Attorney, Agent, or Firm* — Fenwick & West LLP

(57) ABSTRACT

A computing server may receive, from an application operator, a design of an in-application user interface (UI) for display by a software application owned by the application operator. The computing server may also receive a trigger condition for displaying the in-application UI. The computing server may compile the design to a payload that includes one or more UI objects that define the in-application user interface and parameters of the UI objects. A software development kit (SDK) incorporated in a software application may monitor an event associated with a computing device at which the software application is installed. If the event meets the trigger condition for displaying the in-application UI, the SDK may receive the payload from the computing server. The SDK may cause the software appli- (Continued)

cation to render, based on the payload, the in-application UI in a native code of the software application.

20 Claims, 8 Drawing Sheets

(51) Int. Cl.

| | |
|---|---|
| ***G06F 8/41*** | (2018.01) |
| ***G06F 8/61*** | (2018.01) |
| ***G06F 9/451*** | (2018.01) |
| ***G06F 9/54*** | (2006.01) |
| ***H04L 67/00*** | (2022.01) |
| ***H04L 67/55*** | (2022.01) |

(52) U.S. Cl.
CPC .............. *G06F 9/451* (2018.02); *H04L 67/34* (2013.01); *H04L 67/55* (2022.05); *G06F 9/542* (2013.01)

(56) References Cited

U.S. PATENT DOCUMENTS

| | | | | |
|---|---|---|---|---|
| 2020/0314195 | A1 * | 10/2020 | Matthews | H04L 67/55 |
| 2021/0096708 | A1 | 4/2021 | Mangtani et al. | |
| 2021/0144213 | A1 | 5/2021 | Momchilov et al. | |
| 2022/0086058 | A1 | 3/2022 | Powar et al. | |
| 2022/0137811 | A1 | 5/2022 | Lee et al. | |

OTHER PUBLICATIONS

Ahasanuzzaman, Md., et al., Studying Ad Library Integration Strategies Of Top Free-To-Download Apps, IEEE Transactions On Software Engineering, vol. 48, No. 1, Jan. 2022, 16 Pages, [retrieved on Apr. 23, 2026], Retrieved from the Internet: <URL:http://ieeexplore.ieee.org/>.*

PCT International Search Report and Written Opinion, PCT Application No. PCT/US2024/031493, Sep. 9, 2024, eight pages.

* cited by examiner

500

```
Presentation:
    dismiss_on_touch_outside: true
    default_placement:
        ignore_safe_area: false
        position:
            horizontal: center
            vertical: center
        shade_color:
            default:
                alpha: 0.2
                hex: “#000000”
                type: hex
        size:
            height: 100%
            max_height: 100%
            max_width: 100%
            min_height: 100%
            min_width: 100%
            width: 100%
    disable_back_button: false
    dismiss_on_touch_outside: false
    type: modal
```

600

FIG. 6A

```
version: 1
view:
  type: state_controller
  view:
    identifier: 98354588-45a2-4ca2-b9b6-e0b6e02a6e69
    submit: submit_event
    type: form_controller
    form_enabled:
      - form_submission
    view:
      items:
        - position:
              horizontal: center
              vertical: center
            size:
              height: 100%
              width: 100%
            view:
              background_color:
                default:
```

600

FIG. 6B

IN-APPLICATION DYNAMIC USER INTERFACE RENDERING

CROSS-REFERENCE TO RELATED APPLICATIONS

This application claims the benefit of U.S. Provisional Patent Application No. 63/470,411, filed on Jun. 1, 2023, which is hereby incorporated by reference in its entirety.

TECHNICAL FIELD

The present disclosure generally relates to a server that distributes in-application user interface and, more specifically, to a server that delivers a payload that can be rendered in a native code environment of a software application.

BACKGROUND

Mobile application environments present many challenges to the seamless and graceful presentation of application user interfaces. Developers are motivated to constantly improve their applications to improve the user experience, as well as to utilize memory, processor, and batter resources efficiently. However, application updates are typically limited by their slow update cycles and can suffer other issues such as requiring end users to manually performing updates. As such, it has been challenging to tailor user experience in a personalized and dynamic fashion for application publisher. To deliver more targeted information to end users, some application publishers may embed outside tools such as web browsers in the mobile applications. Such solutions can have significant drawbacks with respect to the web browsers being incompatible with the native applications.

BRIEF DESCRIPTION OF THE DRAWINGS

FIGS. 6A and 6B are conceptual diagrams illustrating an example payload that may be used to render an in-application user interface, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed embodiments herein are related to a computing server that provides a platform for application operators to build and design one or more in-application user interfaces for distribution to end users. The in-application user interfaces can be delivered to various end users in a targeted and personalized manner during the runtime of the software application without a formal update of the application. The software application may incorporate a software development kit (SDK) of the computing server so that the SDK may render the in-application user interface in the native code of the application. From the end user perspective, the end user may experience the software application in a dynamic fashion without having to perform an update to the application. The computing server may provide an online platform for various application operators to design user interfaces in a no-code environment. As such, non-programmer employees of the application operators can utilize the service and infrastructure provided by the computing server to perform various tasks that are conventionally reserved for software engineers, such as performing A/B testing, update of software interface, and delivery of in-application information that is rendered using the native code of the application.

Example System Environment

Figure 1:
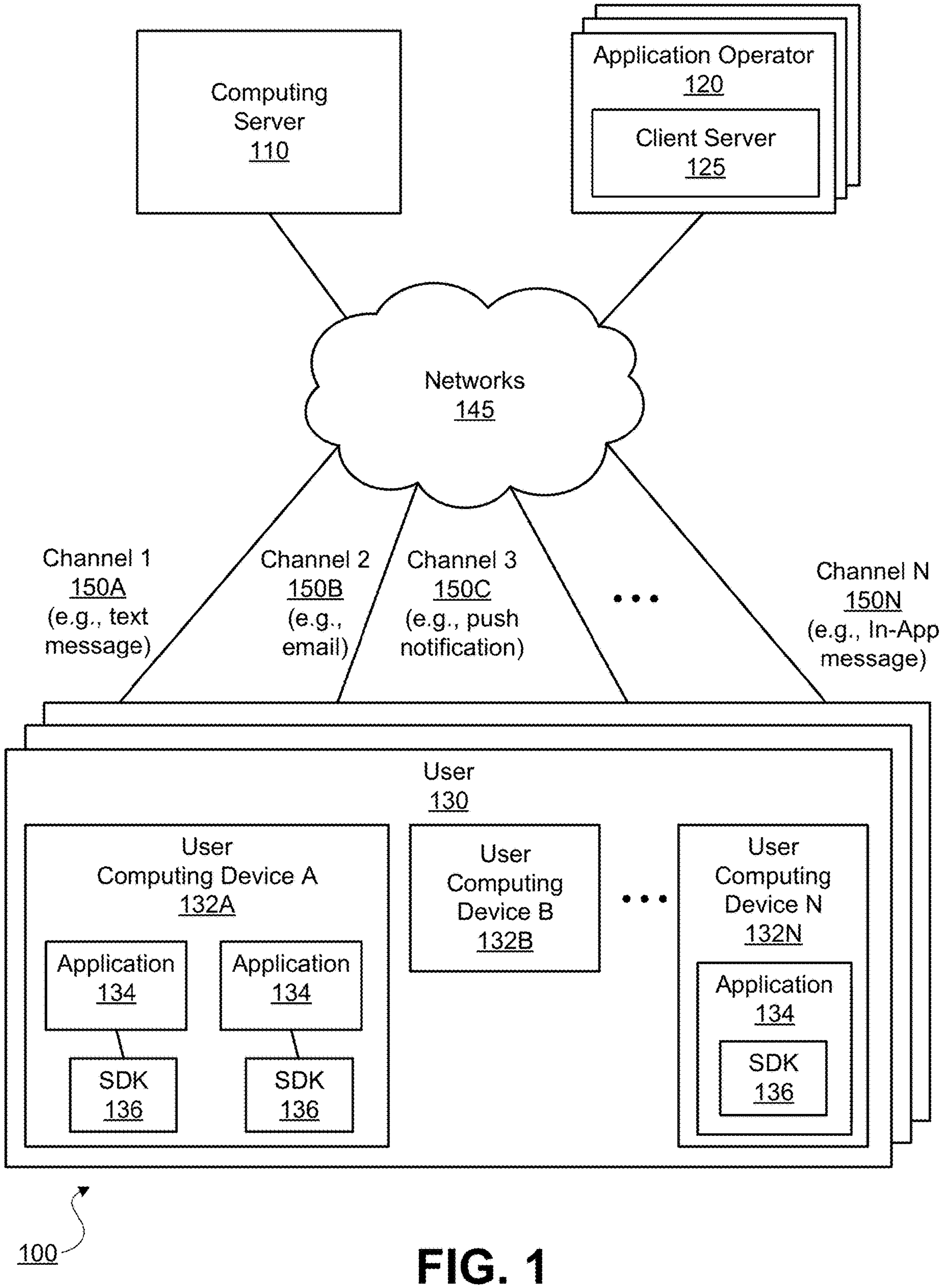
FIG. 1 is a block diagram illustrating an example system environment, in accordance with an embodiment.

Referring now to FIG. 1, shown is a block diagram illustrating an embodiment of an example system environment 100 for delivering in-application UI overlays and dynamic preference options for software applications, in accordance with an embodiment. By way of example, the system environment 100 includes a computing server 110, one or more computing devices associated with one or more application operators 120, and one or more users 130 who possess user computing devices 132. Each user 130 may be associated with one or more user computing devices 132 (e.g., 132A, 132B, . . . , 132N (N being an nth device, n being some number; generally computing devices 132)). The entities and components in the system environment 100 may communicate with each other through networks 145. The computing server 110 may communicate with various user computing devices 132 through different channels 150 (e.g., 150A, 150B, 150C, . . . , 150N (N being an nth device, n being some number); generally channels 150). In various embodiments, the system environment 100 may include fewer or additional components. The system environment 100 also may include different components. Also, while some of the components in the system environment 100 may sometimes be described in a singular form, the system environment 100 may include one or more of each of the components. For example, there may be multiple application operators 120 and multiple users 130. Various application operator 120 may be independent entities such as different customers of the computing server 110, which serves as a service provider that manages the message distribution and associated actions on behalf of the application operators 120.

The computing server 110 may include one or more computers that perform various tasks related to configuring various types of communication elements for different application operators 120, transmitting communication elements to various users 130 on behalf of the different application operators 120, providing user interface design portal, distributing in-application user interface (UI) on behalf of application operators, managing in-application user experiences, determining conditions and channels to transmit various communications, transmitting a series of messages using different channels 150, receiving responses from users 130, forwarding the responses to the application operators 120, and, in some cases, taking actions on behalf of the application operators 120 based on the responses from the message recipients. Communication elements may include in-application UI, dynamic preference center, two-way messaging series, in-app survey, messages, and other suitable communications. For example, the computing server 110 may send an in-application UI on behalf of an application operator 120 to a user 130 during the runtime of an application. The computing server 110 may send one or more messages to a user 130 to solicit a response from the user 130. Based on the response, the computing server 110 may perform actions on behalf of the application operator 120. In another example, the computing server 110 may launch a cross-channel re-engagement campaign on behalf of an application operator 120. A user 130, who may be a customer of the application operator 120, may have been inactive with the application operator 120. The computing server 110 may send messages through different channels to attract the user 130 to re-engage with the application operator 120. Implementation of transmission of messages through different channels may be referred to as a message orchestration. The computing server 110 may facilitate configuration and/or transmittal of various types of messages, such as text messages, emails, push-notifications, browser notifications, in-applications (in-app) user interface (UI) messages, or other in-app messages. In particular, various embodiments relating to configuring, transmitting, displaying, and/or processing user interactions with in-application UI. As will be described in greater detail below, in-application UI include configuration data for one or more UI elements for integration into interfaces of an application. Example UI elements include widgets, input controls (e.g., buttons, switches, etc.), navigational controls, banners, various media (e.g., images, icons, etc.), standalone UIs, etc. Although in-application UI are described herein in relation to graphical user interfaces (GUIs), one skilled in the art will appreciate that other types of UIs may be possible (e.g., audio user interfaces).

The computing server 110 may include a combination of hardware and software. The computing server 110 may include some or all example components of a computing machine described with FIG. 7. The computing server 110 may also be referred to a message management server, an application UI management server, or an application user experience management server. Also, the computing server 110 may include the party that operates the computing server 110 such as a business-to-business provider that provides services to other businesses for managing application user experiences. The computing server 110 may take different forms. In one embodiment, the computing server 110 may be a server computer that executes code instructions to perform various processes described herein. In another case, the computing server 110 may be a pool of computing devices that may be located at the same geographical location (e.g., a server room) or be distributed geographically (e.g., clouding computing, distributed computing, or in a virtual server network). The computing server 110 may also include one or more virtualization instances such as a container, a virtual machine, a virtual private server, a virtual kernel, or another suitable virtualization instance. The computing server 110 may provide application operators 120 with various message management services and merchant services as a form of cloud-based software, such as software as a service (Saas), through the networks 145. Examples of components and functionalities of the computing server 110 are discussed in further detail below with reference to FIG. 2.

U.S. Pat. No. 11,050,699, entitled “Cross-channel Orchestration of Messages,” granted on Jun. 29, 2021, is incorporated herein by reference for all purposes. US Patent Application Publication No. 2023/0041924, entitled “In-application User Interface Messaging,” published on Feb. 9, 2023, is incorporated herein by reference for all purposes.

Application operators 120 are entities that control software applications 134 that are used by user computing devices 132. For example, an application operator 120 can be an application publisher that publishes mobile applications available through application stores (e.g., APPLE APP STORE, ANDROID STORE). In some cases, the application may take the form of a website and the application operator 120 is the website owner. In some embodiments, the application operators 120 are businesses that provide goods and/or services to end users who possess the user computing devices 142. In some embodiments, an application operator 120 sells products through an application 134 and may be referred to as a merchant.

By way of example, application operators 120 may be organizations and individuals that interact with the computing server 110. The application operators 120 may be the customers of the computing server 110. The application operators 120 can be of different natures and can be any suitable types of organizations, natural persons, or robotic devices. For example, an application operator 120 can be an administrator and/or developer of a software application, such as software applications 134 described in greater detail below. In another example, an application operator 120 can be a government entity that provides important or emergency messages to citizens. In another example, an application operator 120 can be an educational institute that sends announcements to its students through different channels 150. Some application operators 120 may also be private businesses or individuals. In one case, a retail business may be an application operator 120 that uses the service of the computing server 110 to distribute marketing announcements and advertisements to various users 130. In another case, another retail business may use the computing server 110 to transmit gift cards, coupons, store credits, and receipts as various forms of messages to users 130. In yet another case, an application operator 120 may be an airline that sends passes (e.g., boarding passes) and flight status updates to users 130. In yet another case, an application operator 120 may be a bank that sends statements and payment reminders to users 130. In yet another case, an application operator 120 may be a news organization that sends news and articles to its subscribers. In yet another case, an application operator 120 may be a social networking system that sends feeds and contents to users 130. In yet another case, an application operator 120 may be an individual who sends messages to his families, friends, and other connected individuals. In yet another case, an application operator 120 may be a retail company that sends offers to its customers and the customers may make in-app purchase by directly responding to the message. These are non-exhaustive examples of application operators 120. An application operator 120 may be an independent entity of the computing server 110 or may control the computing server 110, depending on embodiments. Various application operators 120 may be independent and unrelated entities, such as different unrelated businesses. Application operators 120 may also be referred to as message publishers.

Each application operator 120 may be associated with one or more client servers 125 that are used to communicate with the computing server 110 and users 130. The client servers 125 may also be referred to as application operator servers 125, application operator devices 125 or client devices 125. Each client server 125 may be a computing device that can transmit and receive data via the networks 145. The client server 125 may include some or all of the example components described with FIG. 7. A client server 125 performs operations of various day-to-day tasks of the corresponding application operator 120. For example, a bank (an example application operator 120) may include a server 125 that manages the balances of accounts of its customers, processes payments and deposits, and performs other banking tasks. In another example, an airline (another example application operator 120) may include a server 125 that manages the flight statuses, generate boarding passes, and manages bookings of the customers. A client server 125 may also be a server for controlling and operating software applications 132 that are published by the application operator 120 and are installed at different user computing devices 132. The precise operations of a client server 125 may depend on the nature of the corresponding application operator 120.

An application operator 120 may interact directly with its customers or end users, who are examples of users 130, and may delegate certain operations, such as sending certain types of messages, to the computing server 110. An application operator 120 may maintain accounts of its users and manage day-to-day interactions with the users while directing the computing server 110 to distribute messages to the users on behalf of the application operator 120. For example, the application operator 120 may use a UI management system provided by the computing server 110 to design messages and in-application UI and set conditions, channels, and intended recipients of the messages and in-application UI. The application operator 120, through the computing server 110, may launch a message campaign that includes an individual messages or a series of messages to be automatically delivered to various users 130. One of the messages may take the form of an in-application UI. The message campaign may involve delivering various communication elements through different channels 150. Additionally, the message campaign may involve providing one or more in-application UI messages describing configurations for in-application UI elements for display to users 130, such as via in-app display in an application 134 on a user computing device 132. In some cases, the computing server 110 may take different actions based on the responses provided by the users 130.

In some embodiments, a message may be considered to be transmitted from the application operator 120 regardless of whether the application operator's server directly sends the message or the computing server 110 sends the message.

To design an in-application UI or a message campaign, or to perform some other operations, an application operator 120 may communicate with the computing server 110 through the client server 125 or a computing device associated with the application operator 120. The methods of communication may vary depending on embodiments and circumstances. For example, an individual associated with an application operator 120 (e.g., an employee) may communicate with the computing server 110 through a web application that is run by a web browser such as CHROME, FIREFOX, SAFARI, INTERNET EXPLORER, EDGE, etc. In another case, the computing server 110 may publish a mobile application or a desktop application that includes a graphical user interface (GUI). An individual associated with an application operator 120 may use the mobile or desktop application to communicate with the computing server 110. In yet another case, a client server 125 may communicate directly with the computing server 110 via other suitable ways such as application program interfaces (APIs).

A user 130 is an intended recipient of communication elements that may be designed by an application operator 120 and sent from the computing server 110. Users 130 may be users, customers, subscribers, viewers, or any suitable message recipients of the application operator 120. Users 130 may also be referred to as end users or simply users. Users 130 can be individuals, organizations, or even robotic agents. Each user 130 may possess one or more user computing devices 132. The user computing devices 132A, 132B, . . . 132N may be of different kinds. For example, a user may have a smart phone, a laptop computer, and a tablet. One or more user computing devices 132 may have the components of a computing machine illustrated in FIG. 7. Examples of user computing devices 132 include personal computers (PC), desktop computers, laptop computers, tablets (e.g., iPADs), smartphones, wearable electronic devices such as smartwatches, smart home appliances (e.g., smart home hubs and controllers), vehicle computer systems, or any other suitable electronic devices.

User computing devices 132 may also include one or more Internet-of-Things (IoT) devices. An IoT device may be a network-connected device embedded in a physical environment (e.g., building, vehicles, appliances (home or office), etc.). In some cases, an IoT device has general processing power that is comparable to a computer. In other cases, an IoT device may have limited processing resources, low power, and limited bandwidth for communications. For example, an IoT device may be a sensor. An IoT device may be configured to gather and provide information about its physical environment. In various embodiments, an IoT device connects to the network 145 to provide information gathered from and/or associated with the environment. Data may be gathered through one or more sensors associated with the device and/or through inputs received through the device.

Some of the user computing devices 132 may be installed with an application 134 that is developed and operated by the application operator 120. The application 134 may also be referred to as a software application. The application 134 or a portion of it may be developed using a software development kit (SDK) 136 provided by the computing server 110. For example, the application 134 may incorporate the SDK 136 as part of the application 134. At the code level, this may be done by importing one or more libraries of functions and codes of the SDK 136 to the software code of the application 134 in the header section of the software code and having the code calling one or more functions of the SDK 136. While the application operator 120 primarily operates the application 134, the SDK 136 allows the user computing device 132 to communicate with the computing server 110. For example, an example application operator 120 may be a retail business that develops an application 134 for its customers to purchase items through the application 134. A customer may opt-in to allow the application 134 to track certain analytics. The analytics may be forwarded to the computing server 110 through the SDK 136. In another example, the computing server 110 may send in-application UI to the user 130 through the SDK 136. Upon the receipt of the payload of the UI, the SDK 136 has a UI renderer that renders the in-application UI for display in the application 134.

The application 134 may run on Swift for iOS and other APPLE operating systems or on Java or another suitable language for ANDROID systems. In another case, an application 134 may be a software program that operates on a desktop computer that runs on an operating system such as LINUX, MICROSOFT WINDOWS, MAC OS, or CHROME OS. A user computing device 132 may be installed with different applications 134. Each application 134 may be developed by different creators. For example, in some embodiments, a first application 134 is developed by a first application operator 120 and a second application 134 is developed by a second application operator 120.

The SDK 136 developed by the computing server 110 may be included by multiple applications 134. For example, multiple application operators 120 may be customers of the computing server 110 and include instances of the SDK 136 in the applications 134 developed by the application operators 120, as illustrated in the user computing device A 132A. Each application 134 may communicate to an instance of the SDK 136 through the functions and libraries of the SDK 136 included in the application 134. Each instance of the SDK 136 may be associated with a unique SDK identifier that is used to identify the instance of the SDK 136 in a particular user computing device 132. Each application 134 that includes the SDK 136 may be associated with a unique channel identifier that is used to identify the application 134 by the computing server 110. For example, when a new application 134 is installed in a user computing device 132 and the new application 134 has imported the functionality of the SDK 136, the computing server 110 may assign a new channel identifier for the newly installed application 134. The computing server 110 may send in-app messages to different applications through the SDK 136 by using different channel identifiers.

In some embodiments, the SDK 136 manages in-application UI and dynamic preference options provided to users 130. The payload of the in-application UI includes data may describe configurations for in-application UI elements for in-app display within the application 134 on a user computing device 132. Dynamic preference options are option menus that can be used to change one or more configuration of an application 134. The option menus are dynamic because an application operator 120 may change the items in the option menus through the computing server 110 without causing a change of computer code or an update to the application 134. As such, non-computer programmers (e.g., business personnel) may be able to change the configuration of the application 134 and provide new options to the end users without having to request the software developer to launch a new software version.

The SDK 136 may communicate with the computing server 110 to receive or otherwise obtain an in-application UI including configuration data corresponding to in-application UI elements, such as configuration data defining display constraints or criteria, display styles, assets, trigger conditions, channels, intended recipients, or other suitable data usable to render in-application UI elements. The SDK 136 may further communicate with the application 134 in order to render in-application UI elements within the application 134, such as to augment a UI of the application 134 with a UI element (e.g., via a popup or modal) or to navigate to a standalone UI provided by the message management server from a UI of the application 134. In some embodiments, the configuration data for an in-application UI element includes representation of a design of the in-application UI element (e.g., a markup language or data structure) as provided via one or more GUIs or other interfaces of the computing server 110, such as by the application operator 120. In this case, the SDK 136 may process the design representations (e.g., markup language, CSS schemes, or other front-end UI elements and configurations) in order to render the in-application UI element for display within the application 134. In some embodiments, the payload of the UI may take a form of a domain specific language that is translatable by the SDK 136. The SDK 136 may additionally, or alternatively, process user interactions with in-application UI elements via communication with one or both of the application 124 and the computing server 110. Various embodiments of the SDK 136 managing in-application UI messages transmitted by the computing server 110 are described in greater detail below.

The computing server 110 may associate end users with SDK identifiers and channel identifiers to identify the applications 134 and the computing devices 132 that are possessed by a particular end user. The identification of the end users may allow the computing server 110 to send cross-channel messages to a particular end user. In some embodiments, when a new application 134 is installed in a user computing device 132, the computing server 110 may associate the new channel identifier with the end user. Based on pre-authorization or upon the user's authorization when prompted, the end user may use the user-specific information and credentials that are saved in the computing server 110 or another source for the new application 134 without having to re-enter the information. The user may perform certain in-app actions, such as purchases, with simplified procedures, such as without having to re-enter payment information or verifying credentials.

The networks 145 provide connections to the components of the system environment 100 through one or more sub-networks, which may include any combination of the local area and/or wide area networks, using both wired and/or wireless communication systems. In one embodiment, the networks 145 use standard communications technologies and/or protocols. For example, a network 145 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 145 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 145 may be represented using any suitable format, such as hypertext markup language (HTML), extensible markup language (XML), JavaScript object notation (JSON), structured query language (SQL). In some embodiments, all or some of the communication links of a network 145 may be encrypted using any suitable technique or techniques such as secure sockets layer (SSL), transport layer security (TLS), virtual private networks (VPNs), Internet Protocol security (IPsec), etc. The networks 145 also include links and packet switching networks such as the Internet.

The computing server 110 may transmit messages to users 130 via different channels 150. A channel 150 may be associated with a communication protocol or another non-standard method. A channel 150 may also be referred to as a communication channel. Examples of channels 150 include text messaging services (e.g., SMS, MMS), emails (e.g., mobile emails, plain text emails, browser emails), push notification protocols (e.g., APPLE push notification, ANDROID push notification), instant messaging applications (WHATSAPP, WECHAT, TELEGRAM), in-application messages (e.g., messages sent within application 134), social networking systems (e.g., FACEBOOK, TWITTER), RSS feeds, web browser notifications, other suitable protocols such as simply message payloads sent as an Internet packet or a series of packets. The computing server 110 may decide that a message is to be transmitted through one or more channels based on the setting provided by the application operator 120. In some embodiments, messages may be sent in the form of in-application UIs. Since in-application UIs contain text, in-application UIs are considered as one type of messages. The details of the selection of channels will be discussed in further detail below with reference to FIGS. 2 and 3.

A channel 150 may or may not correspond to a user computing device 132. For certain types of channels 150, the user computing device 132 that will receive the message is fixed. For example, for an SMS message, the user computing device 132 that is associated with the phone number will receive the message. An in-app message may also be sent to the user computing device 132 with which the application 134 is installed. A message intended for an IoT device may also be sent using a channel 150 that is associated with the IoT device. Yet, in other cases, the user computing device 132 that is going to receive the message is not fixed. For example, a user 130 may read an email message from more than one user computing device 132.

In some cases, a user computing device 132 may be installed with multiple applications 134 that have included the SDK 136 developed by the computing server 110. In such cases, the SDK 136 has a different channel identifier associated with each application 134. The in-app messages for different applications 134 are considered to be sent via different channels. In some embodiments, an in-app message to a user 130 and the response of the recipient for a particular application 134 may be communicated through a specific application channel that does not cross talk with other in-app messages associated with different applications 134.

Example Message Management Server Components

Figure 2:
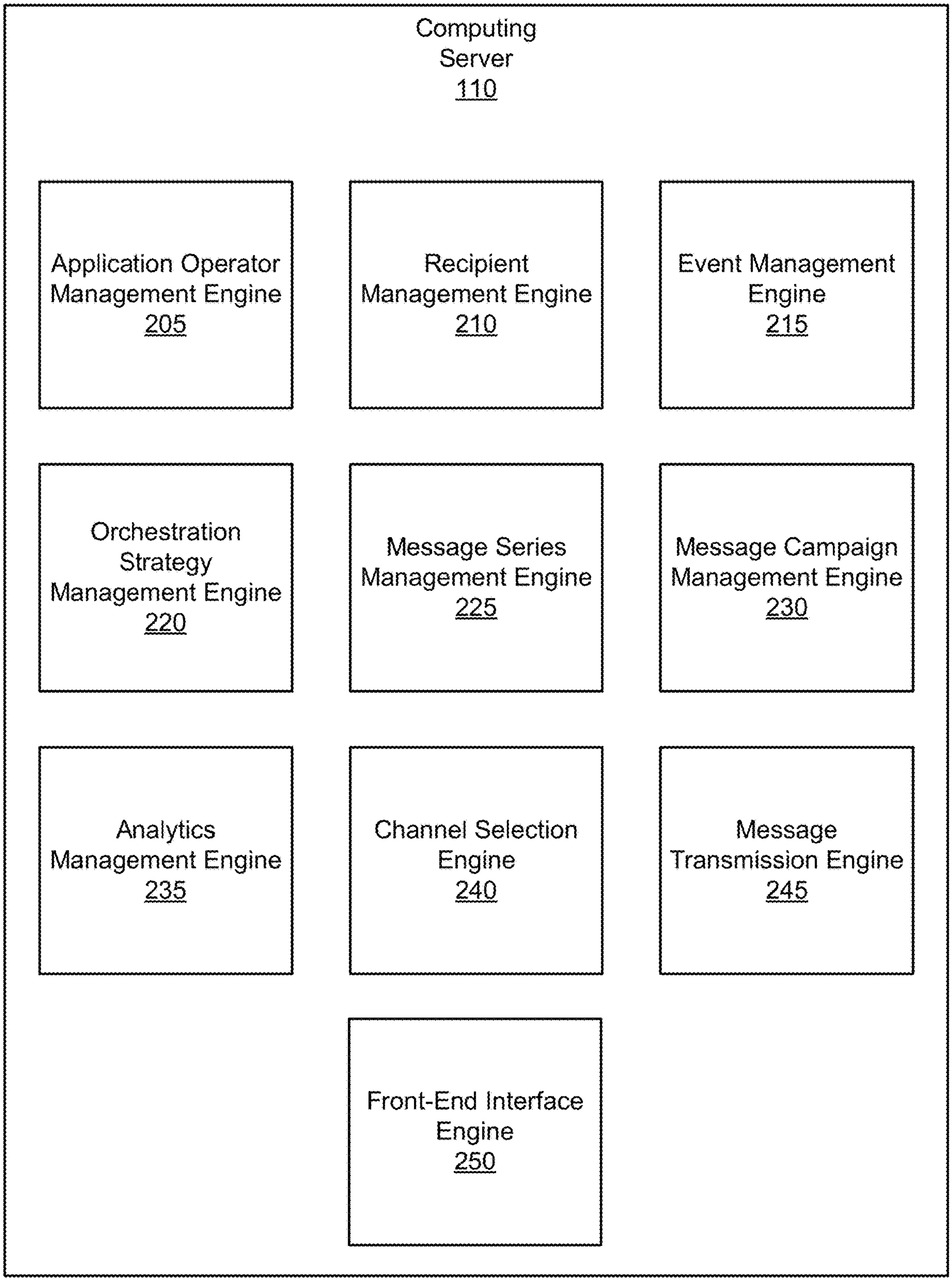
FIG. 2 is a block diagram illustrating various components of an example computing server, in accordance with some embodiments.

FIG. 2 is a block diagram illustrating various components of an example computing server 110, in accordance with some embodiments. A computing server 110 may include a application operator management engine 205, a recipient management engine 210, an event management engine 215, an orchestration strategy management engine 220, a message series management engine 225, a message campaign management engine 230, an analytics management engine 235, a channel selection engine 240, a message transmission engine 245, and a front-end interface engine 250. In various embodiments, the computing server 110 may include fewer or additional components. The computing server 110 also may include different components. The functions of various components in computing server 110 may be distributed in a different manner than described below. Moreover, while each of the components in FIG. 2 may be described in a singular form, the components may present in plurality.

The components of the computing server 110 may be embodied as software engines that include code (e.g., program code comprised of instructions, machine code, etc.) that is stored on an electronic medium (e.g., memory and/or disk) and executable by a processing system (e.g., one or more processors and/or controllers). The components also could be embodied in hardware, e.g., field-programmable gate arrays (FPGAs) and/or application-specific integrated circuits (ASICs), that may include circuits alone or circuits in combination with firmware and/or software. Each component in FIG. 2 may be a combination of software code instructions and hardware such as one or more processors that execute the code instructions to perform various processes. Each component in FIG. 2 may include all or part of the example structure and configuration of the computing machine described in FIG. 7.

The application operator management engine 205 manages the profiles and credentials of application operators 120 and stores saved templates, messages, and in-application user interface designs for the retrieval of the application operators 120. For example, a customer that intends to use the application operator management engine 205 to design an in-application UI and distribute the UI to various end users may create an account with the computing server 110. The computing server 110 stores the customer's profile, metadata, credential and associate the information with a unique customer identifier, such as publisherID. The customer (an example of an application operator 120) may create message templates, message series templates (e.g., onboarding templates), scene templates, digital pass templates (e.g., digital boarding passes and digital coupons), and in-application UI templates, specify criteria of message distribution and goals of message campaigns, select or specify types of events and analytics to be captured by the computing server 110, and configure other settings with the computing server 110. The templates and settings are associated with the customer identifier and can be retrieved, duplicated, edited, and deleted based on the application operator's preferences and actions entered through an in-application UI and message design platform and/or API provided by the computing server 110. The in-application UI and message design platform also may enable (or provide for display) one or more graphical user interfaces (GUIs) for rendering on, for example, a user computing device 132. Further, the user may upload templates of varying formats to the application operator management engine 205 to access and apply when creating messages, scenes, digital passes, or in-application UI templates.

By way of example, the application operator management engine 205 may include an application operator profile database, which may also store information including filter preferences, event types, application operator server destination, and predictive and automation settings for registered users. In other embodiments, the application operator account database may also store additional services that an application operator 120 would like to interface with, including the number of active streams associated with the application operator 120. For example, these additional services can be other application operators and/or strategic partners. Continuing with the example, an application operator 120 may optionally choose to create three active streams. One stream may be associated with a server configured to receive a stream generated associated with an application operator 120 at a specific server destination, e.g., www.foo.com, another with a server associated with a social media system, e.g., FACEBOOK, TWITTER, PINTEREST, etc., and the last with a server associated with a application operator organization. In some example cases, the preferences associated with a application operator profile may be a username and/or destination address. The computing server 110 may also be configured to accept additional application operator preferences. This additional application operator information may capture targeted demographics information, spending habits, travel habits, and other such details.

In some embodiments, the application operator management engine 205 may also store credentials or access keys of application operators 120. The application operator 120 may provide the computing server 110 an access key, such as an API access key with a particular level of access privilege, for the computing server 110 to query the third-party system to retrieve information of the end users.

The recipient management engine 210 manages the users 130 to whom the messages and/or in-application UI are sent. An application operator 120 may specify a set of intended users 130. A user 130 may be associated with a recipient identifier, recipientID. Depending on whether a user 130 is identified as possessing a user computing device 132, applications 134, and/or SDK 136, the recipient management engine 210 may also associate the recipientID with one or more of a device identifier, application identifier (which may be in the form of channel identifier), and SDK identifier. For example, each user computing device 132 associated with the user 130 may be associated with a device identifier, deviceID. For some devices, the recipient management engine 210 may also store application identifier, applicationID, for identifying actions occurred at or related to an application 134 and track in-app messages sent through the application 134. A set of recipientIDs, deviceIDs, and applicationIDs may be associated with a publisherID.

The recipient management engine 210 may maintain metadata tags for users 130. For metadata tags may include information such as whether a recipient is a natural person or not, preferences of the users 130, opt-in or opt-out options of the users 130 (e.g., a message recipient may opt-out for receiving a message from a particular channel), and other characteristics of the message recipients, including consented information such as gender, age, interested products, interested news, etc. Based on the characteristics of the users 130, the recipient management engine 210 may categorize the message recipients into one or more groups. The recipient management engine 210 may also store records of messages sent to each user 130, such as metadata of the messages (e.g., date and time of the messages, the channel identifier, channelID, used to send a particular message), the payloads of the messages, actions taken or related to each sent message, and types of devices and deviceIDs to which the message are sent.

The event management engine 215 manages and stores events associated with users 130, user computing devices 132, or applications 134. The events may be transmitted from the application operators 120, from third parties, or from the user computing devices 132.

Events transmitted from the application operators 120 or third parties may trigger a distribution of one or more messages by the computing server 110 to different users 130. By way of example, an application operator 120 may be an airline that transmits an event notification to the computing server 110 that a flight is delayed and identifies the passengers of the flight based on the recipientIDs. Based on the event notification, the computing server 110 may send a message to the passengers. In another example, an application operator 120 may be a bank that sends an event notification to the computing server 110 that an end user has settled a transaction. Based on the event notification, the computing server 110 sends a confirmation message to the end user. In yet another example, the event may be transmitted from a third party. The computing server 110 may identify users 130 that are potentially affected by the event notified by the third party.

The events may also be sent from various user computing devices 132 associated with users 130. Those event notifications may be referred to as mobile event notifications. Each mobile event notification may be associated with a user 130 and be saved along with an event identifier, eventID, a messageID and a recipientID. Mobile event notifications may be transmitted from mobile event sources. In various embodiments, a mobile event source may be an IoT device or a user computing device 132 running an application 134. The application 134 is configured to generate and transmit a mobile event notification. For example, the SDK 136 may include code instructions to cause a user computing device 132 to collect information describing an occurrence of an event and/or transmit a mobile event notification corresponding to the occurrence of the event to the computing server 110. A mobile event notification may be related to a user computing device 132 or may be specific to a particular application 134 that is in communication with the SDK 136.

A mobile event notification from a user computing device 132 may include a notification payload and a destination associated with an application operator 120. In various embodiments, the destination is a network address such as an application operator computer, a proxy server, or another device configured to receive data streams from computing server 110. For example, the destination may be a specified universal resource locator (URL), e.g., "www.application operator.com/proxyserver". The notification payload associated with a mobile event notification, received by computing server 110, may include an event descriptor and a notification identifier.

The event descriptor may include at least one of an application lifecycle event, a user engagement event, a user behavior event, a user insight event, a user location event, or any combination thereof. In one example, an event descriptor is an application lifecycle event such as a "first open" of an application 134, an "inactivity" event (e.g., an application 134 has been inactive), an "app open" event, an "app close" event, or an "app uninstall" event; a user engagement event such as a "push", a "push send", a "rich deliver", a "rich read", a "rich delete", an "in application display", a "digital pass object install" or a "digital pass object remove"; a user behavior event such as a "tag update" event, an "app open" event, an "app close" event, or other custom events defined by an application operator 120. In some embodiments, the event descriptor may also include a user location event such as geolocation, or timestamp data or a user insight event associated with a prediction of a future application lifecycle event, user engagement event, user behavior event, user location event, or any combination thereof. For the ease of reference, all those events, whether they are related to application lifecycle, user engagement, location, or timestamp, may be collectively referred to application lifecycle events.

By way of example of a mobile event notification, a user computing device 132 (e.g., a mobile phone, an IoT device) sends a mobile event notification to computing server 110 if the user computing device 132 is within a threshold distance of a store of an application operator 120, or if the user opens the application 134 or interacts with an IoT device.

A notification identifier may include an identification of the notification and other identification information. For example, the identification may include a userID, an applicationID, a application operatorID, a deviceID, deviceType, or any combination thereof. For example, a mobile event notification generated by a user computing device 132 associated with a user "Nolan" may include a message that a user associated with userID: "Nolan", a deviceID: "02", an event descriptor: "app uninstall" associated with a application operatorID: LATTE, INC., at Time: 11:00 PM PST near a location of 123 Main Street, Portland, Oregon.

In some embodiments, a mobile event source is an IoT device associated with an application operator 120. An IoT device may be configured to transmit a mobile event notification to computing server 110. For example, an IoT device may be a temperature sensor that generates a mobile event notification with the current temperature and transmits the generated mobile event notification to the computing server 110 via network 145.

In some embodiments, upon receiving a mobile event notification from a user computing device 132, the event management engine 215 generates a mobile event token. The mobile event token may be derived (e.g., a hash) in some way from the received mobile event notification and/or metadata relating thereto. In some embodiments, a single mobile event token is assigned to a plurality of received mobile event notifications. Additionally, as used herein, the process of generating a mobile event token from a mobile event notification may be referred to as "decorating a received mobile event notification" and can be used to provide context to mobile event notifications received from a user computing device 132.

In some embodiments, the event management engine 215 may generate the mobile event token by communicating with a number of contextual services. The event management engine 215 may include code segments for generating a mobile event token including assigning context obtained from one or more contextual services. Contextual services may further include any number of modules that extract timestamp data, demographic data associated with a user, GPS data, historical data including historical trends, or any combination thereof from a received mobile event notification. For example, upon receiving a mobile event notification associated with an "app open" event from a user computing device 132, the event management engine 215 generates a mobile event token including a timestamp and a GPS location associated with the received event. In other embodiments, the contextual data assigned to a mobile event token associated with a mobile event notification may be associated with a certain user computing device 132 including one or more identifiers. In still other embodiments, the computing server 110 may decorate a mobile event token with a predicted user behavior including a future user engagement event, an application lifecycle event, or any combination thereof. U.S. Pat. No. 10,567,536, entitled "Mobile Event Notification for Network Enabled Objects," patented on Feb. 18, 2020, is hereby incorporated by reference for all purposes.

In some embodiments, the SDK 136 maintains a set of active in-application UI elements intended for display in the application 134 in response to mobile event-related trigger conditions being met. The SDK 136 may receive in-application UI element messages from the computing server 110 including configuration data for active in-application UI elements including one or more trigger conditions from the computing server 110. In this case, the SDK 136 may update the set of active in-application UI elements based on the received configuration data and/or configure listeners for mobile event notifications corresponding to the one or more trigger conditions. If the SDK 136 determines that the one or more trigger conditions are met, the SDK 136 may communicate with the one or both of the application 134 or the computing server 110 in order to render the in-application UI element for display in the application 134. Embodiments of operations performed by the SDK 136 for rendering in-application UI elements are described in greater detail below with reference to FIG. 4 through FIG. 6B.

In some embodiments, the SDK 136 maintains in-app dynamic preference center UIs for display in the application 134. Similarly to active in-application UI elements described above, the SDK 136 may receive configurations for in-app preference center UIs from the computing server 110. Preference center UI configurations describe in-application UI elements that facilitate user configuration of various user preferences (e.g., app settings). Preferences may correspond to user preferences for operations performed by the computing server 110, such as what types or through what channels a user computing device 132 or application 134 receives from the computing server 110. Additionally, or alternatively, preferences may correspond to user preferences for the application 134. The SDK 136 may embed a mechanism for navigating to an in-app preference center UI corresponding to a preference center UI message received from the computing server 110, such as a button or other interactable UI element. Additionally, or alternatively, the SDK 136 may receive notifications messages from the computing server 110 through one or more channels external to the application 134 (e.g., a push notification, an email, a text message, etc.) including a deep link to an in-app preference center UI.

The orchestration strategy management engine 220 stores strategies and rules provided by application operators 120 for the transmission of messages to various users 130. In some message campaigns, the same message may be sent to a user 130 through multiple channels 150 or a series of related messages may be sent to the user 130 through different channels 150. The transmission of messages through different channels 150 may be referred to as channel orchestration. For example, an application operator 120 may set up a message series for a payment reminder. The first reminder message may be sent through a less disruptive channel 150 such as by an email. Subsequent reminder messages may be sent through more disruptive channels 150 such as a publish notification, an in-app notification, and an SMS message.

The orchestration strategy management engine 220 may allow an application operator 120 to pick different channel selection rules for each message or a series of messages. Example channel selection rules may include channel priority with fall back, last active, originating channel, and fan out option. When the computing server 110 sends a message to a user 130, the computing server 110 selects one or more channels 150 based on the channel selection rules associated with the message.

A channel selection rule for channel priority with fall back allows an application operator 120 to select the priority of the channels to send a message and select fall back channels if a higher-priority channel(s) is not available. A channel selection rule may be applicable to a large group of users 130. The recipient management engine 210 may provide a list of available channels 150 (e.g., channels that are opted in, or not opted out) for each intended user 130. Each intended user 130 may be associated with a different list of available channels 150. The computing server 110 attempts to send the message to the highest priority channel first and falls back to alternative channels if a user 130 does not opt in for the highest priority channel.

The channel selection rule for the last active channel or the originating channel specifies that the computing server 110 sends a message based on the message recipient's last active channel or the originating channel. The event management engine 215 may provide mobile event notifications that include information on whether a user has taken an action (e.g., opening a message, responding to an email, etc.) with respect to a channel 150. If the user takes an action that triggers the computing server 110 to send another message, the new message may be sent to the same channel. This reaction by the computing server 110 may be selected by the originating channel selection rule. The originating channel selection rule may also specify that the computing server 110 to target a channel 150 associated with a trigger event. For example, the application operator 120 may direct the computing server 110 to send a message when a trigger event is detected from a channel 150 or associated with an application related to a channel 150. For example, an application operator 120 may specify that a new message is to be sent when a location event is detected (e.g., a device enter a radius or a territory of a location). The location event may be sent from an application 134. The computing server 110 may send the new message through an in-app message or a push notification associated with the application 134.

The channel selection rule for fan-out specifies that the computing server 110 to send the same message to a user 130 through multiple channels 150 simultaneously or within a reasonable timeframe. An application operator 120 may select multiple channels 150 for the fan-out option. For a specific user 130, the computing server 110 sends the message through various channels 150 unless one or more channels are opted-out by the user 130.

The message series management engine 225 allows application operators 120 to design a message series. Each message series may be referred to as a journey. A message series may include a series of related messages that are sent to a user 130 when a certain condition is met. The message series management engine 225 manages the message series that are designed and saved by various application operators 120. A message series may be associated with a start condition, an end condition, message recipient selection criteria, a message order, message branching, and trigger conditions and channels 150 to be used for each message in the series.

A start condition may include various rules that specify when a message series will be triggered for a particular candidate user 130. A trigger condition may be an event, such as a mobile event when the computing server 110 receives a mobile event notification. For example, a message series may be triggered when a user first opens the application 134. A trigger condition may also be another event whose notification is provided the application operator 120 or a third party. For example, a message series may begin 24 hours after a user has created an account with the application operator 120. Other trigger condition may include tag change, inactivity, first seen, location matching, location attributes, and an event occurring. The start condition may also include timing and date for the first message in the message series to be sent after a trigger condition is met. In some cases, the message series starts immediately after a trigger condition is met. In other cases, the message series is scheduled based on the timing and date. The start condition may also include certain limitations. For example, the limitation may prevent the computing server 110 from involving a user 130 in more than a certain number of message journeys within a predetermined period of time. The limitation may also prevent the computing server 110 from involving a user 130 in a repeated message journey. A trigger condition may also be a risk factor such as a churn risk associated with an application 134 or a channel 150.

An end condition may include various rules that specify when a message series is completed. An application operator 120 may specify that a message series is completed after all messages in the series are sent. Other end condition examples may specify rules for a message series to end prematurely. For example, a message series may end on a conversion event or a cancellation event. A conversion event is associated with a conversion condition. The computing server 110 may exit a user 130 when the conversion event is detected. For example, in a marketing campaign, when a user 130 clicks on an advertisement that is sent as a message, the application operator 120 may specify that the clicking of the advertisement is a successful conversion. In another example, if the message series is for reminding a user to make a monthly payment, the conversion event may be that the user has made the monthly payment. A cancellation event may be an event that is indicated by the user 130 or the application operator 120 to stop the message series when the cancellation event is detected. For example, a user 130 may want to opt-out or unsubscribe from the message series. The message recipient selection criteria allow an application operator 120 to select what users will be selected for a particular message series. The selection criteria could be event-based, metadata tag-based, device-type-based, channel-based, or any combination thereof.

The message order and message branching allow an application operator 120 to select how the messages in a series are arranged. A message series can be linear or can be branched. The application operator 120 may also specify conditions to skip one or more messages.

The trigger conditions and channels 150 to be used for each message in the series are rules that are specified by an application operator 120 indicating conditions for how or when a message will be provided to a user via one of the channels 150. For example, a trigger condition for a message may define conditions that to be met for the message to be transmitted by the computing server 110 via a channel of the channels 150. As another example, a trigger condition for a message may define conditions to be met for the SDK 136 to provide a message to a user of the user computing device 132, such as by displaying an in-application UI or UI element. The trigger condition for a message may be time-based. For example, a second message may be sent 2 days after the first message is sent. The trigger condition for a message may also be event-based, such as when the computing server 110 receives a mobile event notification that matches the trigger condition. The event-based trigger condition may also include a time element such as a delay after the event condition is met. Other trigger conditions discussed in this disclosure are also possible. For each message, an application operator 120 may also select a channel selection rule based on the discussion above with reference to the orchestration strategy management engine 220.

In some embodiments, a message series may include one or more in-application UIs, other types of messages, or some combination thereof. For example, a first in-application UI element corresponding to a first in-application UI message in a message series may facilitate access to a second in-application UI element (e.g., via a user interaction) corresponding to a second in-application UI message in the message series. In cases where the message series includes one or more in-application UI messages, the computing server 110 or the SDK 136 may evaluate the start or end conditions for the individual in-application UI messages relative to other in-application UI messages in the message series. For instance, the SDK 136 may begin listening for one or more start conditions for a second in-application UI message after a first in-application UI message in the message series has been triggered.

In some embodiments, an application operator 120 may design a message series that is a two-way messaging series. In one of the trigger conditions in the series, the condition options may include no response from the user 130 and various types of responses from the user 130. When no response is received, the computing server 110 may allow the application operator 120 to specify that another message is to be sent, which is to be sent by the same channel or by a different channel. This allows the message series to attract the user 130 to re-engage in the message series. If a response is received, the computing server 110 parses the response and determines the action to be taken based on the response. The action may be sending another message to the recipient 130 or may be an activity to be performed by the computing server 110, such as creating a purchase order, canceling a subscription, making a purchase, generating a statement, performing a customer service, issuing or reissuing a mobile pass, etc.

To analyze the response, the computing server 110 may parse the response in various ways. In some embodiments, the computing server 110 may analyze the string pattern and search for keywords in the response. For example, the computing server 110 may search for keyword that represents the user 130 authorizing an action (e.g., making a purchase). The computing server 110 may also look for keywords such as quantity, item name, object name, and named entity in the response. In some embodiments, the computing server 110 may also employ one or more natural language processing technique to analyze the response. In some cases, the response may also include authentication keyword such as a PIN or a password from the message recipient that authorizes a certain transaction. For example, in a message series, the computing server 110 may send an offer of an item on behalf of an application operator 120 to an end user. The end user may provide an in-app response to the message to authorize a purchase. The computing server 110 may complete the in-app purchase upon proper authentication and authorization procedures.

The message campaign management engine 230 manages message campaigns designed by various application operators 120. A message campaign may be a goal-based collection of multiple related message series. For example, an application operator 120 may design a goal-to-goal branching of multiple message series. Each message series may have a goal that is specified in the end condition of message series. The message series are linked together in any suitable ways, branched or linear, cyclic or acyclic. A message campaign may also be referred to as a primary message plan.

In one embodiment, a message campaign may include one or more pages to create a scene. A scene is a series of pages or screens for an in-application UI that is connected in a branched, linear, cyclic, or acyclic manner. A scene may be designed to provide the multi-screen experience by connecting the series of screens in a linear manner (e.g., a Story Mode). The scene is a UI that provides a multi-screen experience for end users. For example, a multi-screen experience may onboard new end users to an application, alert end users of the latest version of an application or educate end users of new functionalities and features of an application. The scene provides multiple engaging and informational in-application UIs to illustrate a story to the end user. In one embodiment, a scene may be designed to be of a full screen interface or a modal interface that is less than a full screen. The SDK 136 may download the designed scene for an application to cache the scene upon receipt of a background push.

The selection of message series in a message campaign may depend on the recipient's response in one or more two-way message series. For example, in a re-engagement campaign, the computing server 110 may determine that the recipient did not provide a response to messages that are sent in one of series. A chunk model may be to determine a threshold level of whether a particular end user has churned with respect to the usage of an application 134. In turn, the computing server 110 may select message series that include communications in other channels to attract the end user to re-engage with the application 134. In another example, an end user may provide a response in a two-way messaging series. Based on the type of response and the goal specified by the application operator 120 when designing the message campaign, the computing server 110 may select different subsequent message series to be sent to the recipient 130.

The analytics management engine 235 provides statistics and analytics for messages, message series and message campaigns. After messages are sent to users 130, the computing server 110 may receive responses from the users 130, mobile event notifications, or other notifications related to the messages. For some of the messages, the computing server 110 may also receive no action from the recipients or any notification at all. A computing server 110 may keep track of the number of users in each message series, actions taken by the users (or inactions) after receiving messages, and other metrics such as rates of meeting certain trigger criteria. An application operator 120 may start a message series or a message campaign in real-time. The computing server 110 may display how many users (users 130) are in each message series and other live analytics in real-time for each message or each message series as a summary of the progress of each message series. The analytics management engine 235 may also provide statistics related to commercial activities in a message series. For example, in a two-way message series, recipients 130 may make various in-app purchases. The analytics management engine 235 may provide conversion rate of the message series for messages sent that resulted in one or more purchases.

The channel selection engine 240 selects one or more channels 150 for transmitting or distributing a message. The channel section engine 240 may select the channels 150 based on the channel selection rules specified by the application operator 120 as discussed in the orchestration strategy management engine 220. The channel selection engine 240 may also perform a channel retargeting operation. The computing server 110 may monitor events such as user behaviors in one channel 150 and decide to send follow up messages in a message series to the users on a different channel. For example, the computing server 110 may determine an application churn risk with respect to a user. In response to the churn risk being higher than a threshold, the computing server 110 may decide to change an in-app message to another channel that is less reliant on the application (e.g., an email channel). The computing server 110 may monitor the interaction or lack of action of the users with one or more messages to determine whether the user receives messages on alternative channels. The computing server 110 may switch from a channel 150 that is tied to one or more applications (e.g., push notification, in-app message, web notification, instant messages in a chat application) to another channel 150 that is more independent. U.S. patent application Ser. No. 15/646,008, entitled "Churn Prediction with Machine Learning," filed on Jul. 10, 2017, is incorporated by reference for all purposes.

The message transmission engine 245 formats messages in appropriate forms, applies certain communication protocols and transmits the messages to users 130. In some embodiments, the message transmission engine 245 may receive text and images of a message payload from an application operator 120. For example, the application operator 120 may design a message using an application provided by the computing server 110. Certain message channels and user computing devices 132 may require a message format in order for the message to be transmitted. For example, an SMS message may not contain an image. The format of a push notification may depend on the operating system of the user computing device 132. The appearances of certain messages may also be affected by the display resolution of the user computing devices 132. The message transmission engine 245 may package a message payload based on the selected channel. The message transmission engine 245 may convert the payload to an appropriate format that is compatible with a message channel, such as JSON, XML, key-value pairs, HTML, etc. Certain channels may also be associated with specific communication protocols. For example, emails may use standard mail protocols, such as Simple Mail Transfer Protocol (SMTP). A message may also need certain headers to be transmitted. The message transmission engine 245 may generate the message payload and convert the payload to one or more network packets to be sent to the users 130.

The message transmission engine 245 may also check rules and timing that may restrict the transmission of a message to a specific user 130. For example, an application operator 120 or a user 130 may restrict the timing for transmitting certain messages (e.g., a do-not-disturb period). There may also be other rules that restrict the transmission of messages to certain recipients 130. The transmission of message may also be subject to one or more privacy settings of the end users, such as options that limit the channels used, options that limits tracking of data and usage, types of messages that are authorized to be sent, subscription and unsubscribe options, etc.

Figure 4:
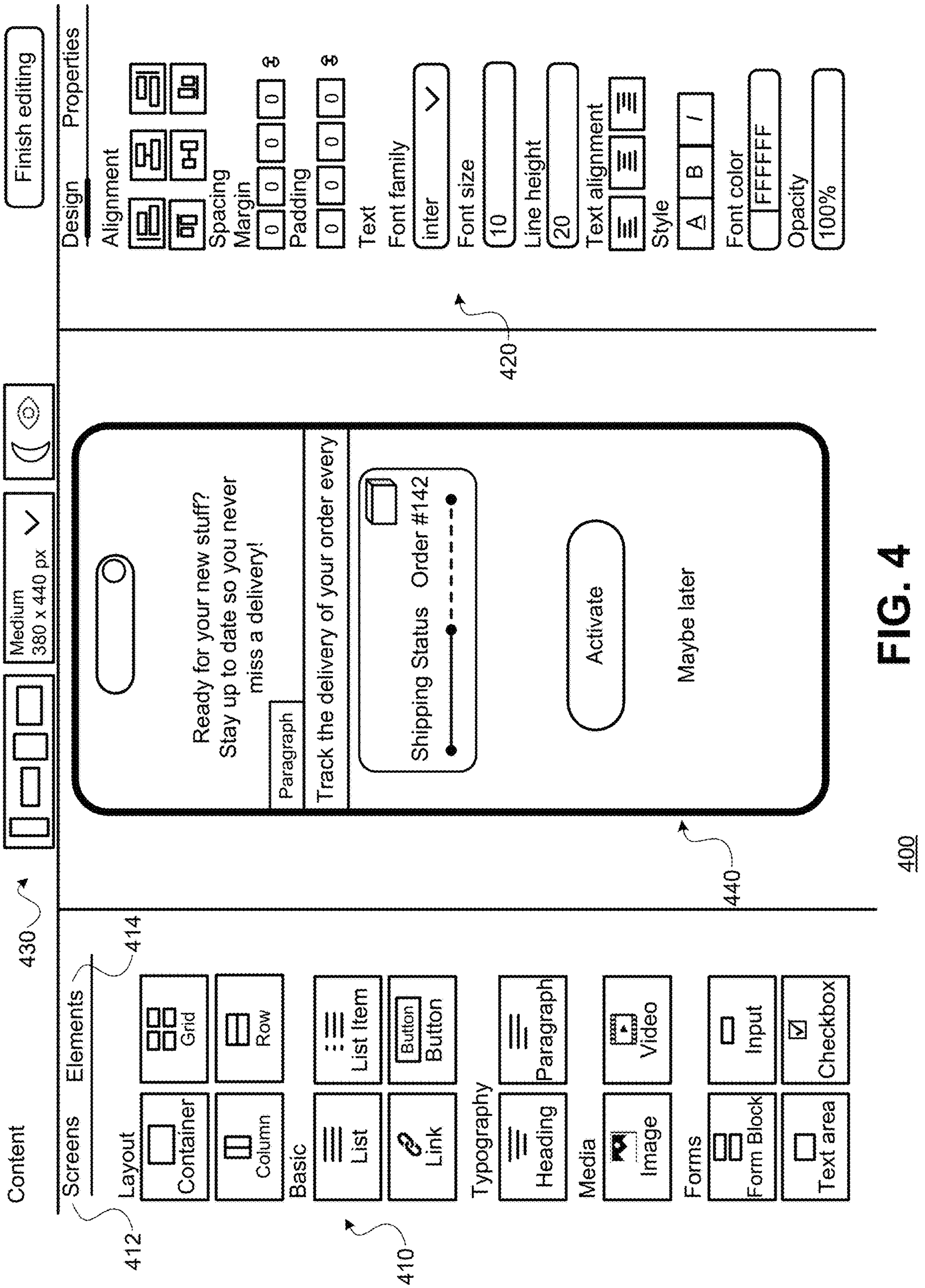
FIG. 4 is a conceptual diagram illustrating an example portal provided by the computing server for an application operator to design an in-application user interface, in accordance with some embodiments.

The front-end interface engine 250 may be a software application interface that is provided and operated by the computing server 110. For example, the computing server 110 may provide a software system for application operators 120 to design and manage various messages, message series, and message campaigns. Examples of the GUI elements of the front-end interface engine 250 for configuring in-application UI elements and/or standalone UIs are shown in FIG. 4. The application provided by the computing server 110 may be distinguished from the application 134 shown in FIG. 1. The application provided by the computing server 110 may be an application for application operators 120 to manage their message campaigns. In contrast, the application 134 may be provided by an application operator 120 for its end users. For example, the application 134 may be a retail business application in which users can purchase items and manage coupons. The application provided by the computing server 110 provides a management platform for the retail business application to manage its message campaigns, such as promotional and marketing messages and two-way messaging to be sent to end users.

The front-end interface engine 250 may take different forms. In one embodiment, the front-end interface engine 250 may control or be in communication with an application that is installed in a client device 125. For example, the application may be a cloud-based SaaS or a software application that can be downloaded in an application store (e.g., APPLE APP STORE, ANDROID STORE). The front-end interface engine 250 may be a front-end software application that can be installed, run, and/or displayed at a client device 125. The front-end interface engine 250 also may take the form of a webpage interface of the computing server 110 to allow application operators 120 to access data and results through web browsers. In another embodiment, the front-end interface engine 250 may not include graphical elements but may provide other ways to communicate with application operators 120, such as through APIs. The API may be in compliance with any common API standards such as Representational State Transfer (REST), query-based API, Webhooks, etc. The data transferred through the API may be in formats such as JSON and XML.

Example Message Object Hierarchy

Figure 3:
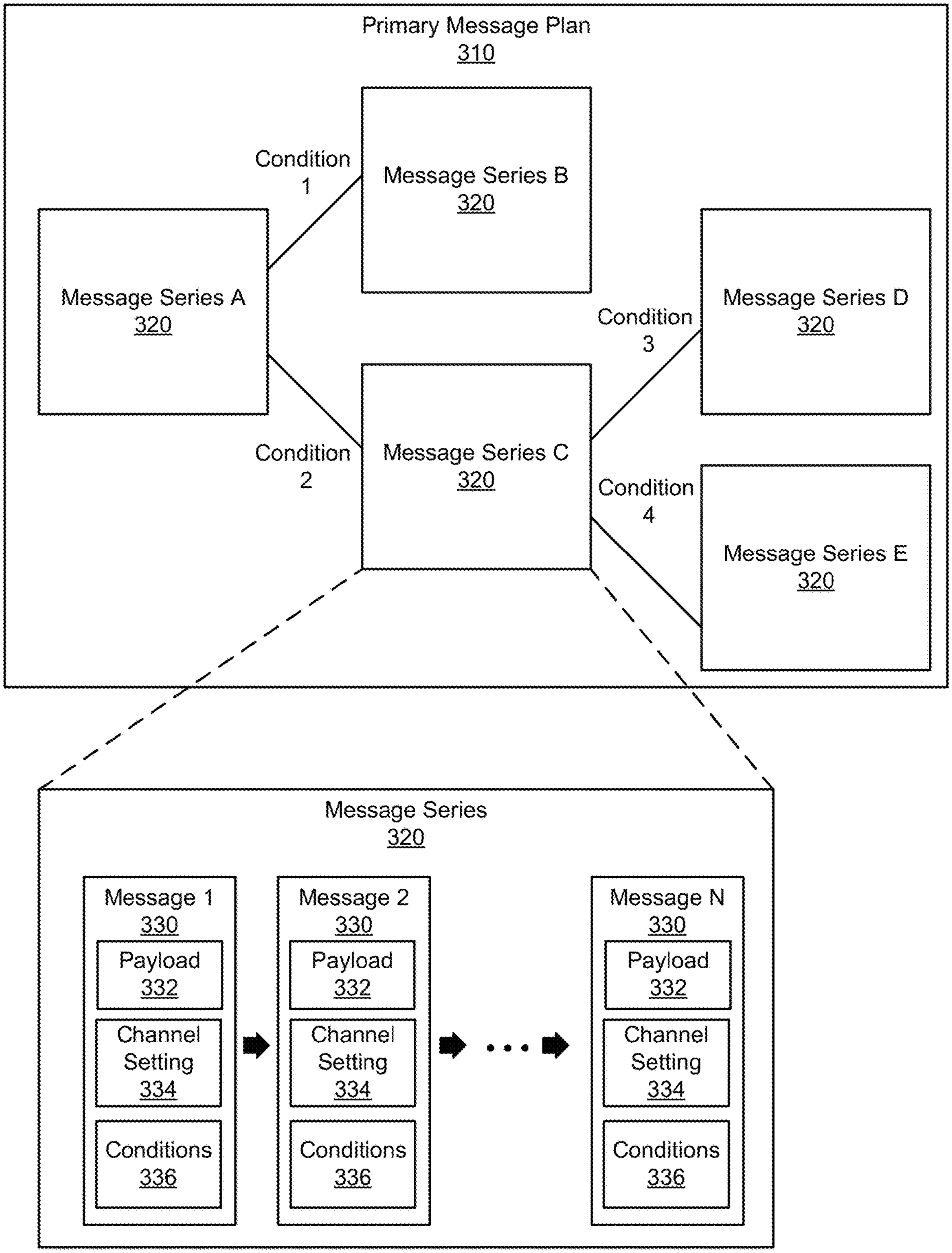
FIG. 3 is a block diagram illustrating an example message object hierarchy that may be used with the computing server, in accordance with some embodiments.

FIG. 3 is a block diagram illustrating an example message object hierarchy that may be used with the computing server 110, in accordance with some embodiments. A primary message plan 310 may include multiple series 320. The primary message plan 310 may also be referred to as a message campaign. Each message series 320 may be referred to as a message journey. Each message series 320 may include one or more messages. An in-application UI that is described in further detail in FIG. 4 through FIG. 6B may be a message series or a part of a message series.

The message series 320 in the primary message plan 310 may be connected in any suitable ways, branched or linear, cyclic or acyclic. The primary message plan 310 may be associated with a set of target recipient criteria that specify which candidate users 130 may enter the message campaign associated with the primary message plan 310. The selection criteria may also be the trigger condition of the first message series A in the primary message plan 310. For example, a candidate user 130 who meets the trigger condition of the first message series A will receive the first message in the message series A and be enrolled in the primary message plan 310. Each message series 320 may be associated with an end condition that is discussed above with reference to the message series management engine 225 in FIG. 2. In some embodiments, a message series 320 may include two or more alternative end conditions, such as the condition 1 and the condition 2 shown in FIG. 3. The computing server 110 may enroll the user 130 to another message series based on the fulfillment of one of the alternative conditions. In some embodiments, except the first message series A, other message series' start condition may be the end condition of the preceding message series based on the branching and connections among the message series 320.

The end condition of a message series 320 may be a goal of the message series 320. For example, the goal of sending a series of messages to a user 130 may be to induce the recipient to perform a certain action. The computing server 110 may receive an event notification from a user computing device 132 or from the application operator 120. The action of the user 130 meeting the end condition of a message series 320 may be a goal of the message series 320. The inaction of the user 130 may be end condition of the same message series 320. Based on the end condition, the user 130 is routed to another succeeding message series 320. Based on the end conditions of various message series 320, the primary message plan 310 provides a goal-to-goal branching of message series 320.

Each message series 320 may include one or more messages 330 that may be connected in any suitable ways, branched or linear, cyclic or acyclic. An application operator 120 may arrange the order and branching of the messages 330 and compose each message 330. The application operator 120 may design the payload 332, the channel setting 334, and the conditions 336 triggering a specific message. The message payload 332 may include text, image contents, and multimedia contents such as voice, videos, and music. The channel setting 334 may be based on the channel selection rules as discussed above with reference to the orchestration strategy management engine 220. The application operator 120 may also specify criteria related to channel retargeting or allow the computing server 110 to automatically perform the channel retargeting. The application operators 120 may also specify the conditions 336 for triggering a message 330 to be sent. The conditions 336 may specify that a succeeding message is sent automatically or after a time delay. The conditions 336 may also specify a mobile event notification for the triggering of a special message. A message 330 may be skipped if the conditions 336 are not met. Other possible conditions are discussed above with reference to the message series management engine 225.

In a message series 320, one or more conditions may include responses from the message recipient so that the message series 320 is an example of two-way messaging series. The computing server 110 may perform an action based on the response. For example, the application operator 120 may design a message series that classifies possible responses into various categories. The application operator 120 may define the action for each category. For example, for a response that specifies a purchase action, the message series 320 may include a condition that directs the computing server 110 to complete the purchase transaction. For another response that specifies the end user's interest in a particular product item, the message series 320 may include a branch of subsequent messages that are to be sent to the message recipients to further promote the product item.

While digital marketing and commerce is used as an example of the implementation if a two-way messaging series, two-way messaging may be used in various other settings, such as managing user preferences (e.g., via UI preference center messages), customer service, customer reengagement, distribution of announcement, management of emergency, boarding pass management, bank service, subscription management, personal messaging, group administration, survey, and any other suitable implementations, whether the implementation is public or private, commercial or governmental, mass distribution or personalized messages, and product related or service related.

Example In-Application User Interface Design Portal

FIG. 4 is a conceptual diagram illustrating an example portal provided by the computing server 110 for an application operator 120 to design an in-application user interface, in accordance with some embodiments. The portal 400 may take various forms, such as a web browser interface that is part of a software-as-a-service (SaaS) platform provided by the computing server 110 to allow different application operators 120 to design different in-application user interfaces for software applications 134 of the application operators 120. The portal 400 may also take the form of a mobile application user interface, a desktop application, or another front end interface portal. In some embodiments, the portal 400 may also take the form of an API that does not provide front end interface elements. The portal 400 may simply be referred to a user interface.

In some embodiments, as illustrated in FIG. 4, the portal 400 provides a user-friendly user interface for an application operator 120 to design an in-application user interface for the software application operated by the application operator 120. The user interface of the portal 400 is not to be confused with the user interface being designed by the application operator 120. The user interface of the portal 400 is a design tool that allows the application operator 120 to make a user interface that will be rendered to the end user in the software application that is operated by the application operator 120. As discussed in further detail below, the portal 400 may provide simulation of the user interface being designed.

In some embodiments, the user interfaces designed by the portal 400 may provide seamless, personalized and dynamic in-application experience to end users. In some embodiments, the portal 400 allows much greater flexibility for an application operator 120 to dynamically adjust its software application, including delivering dynamic application content and personalized content to various end users. For example, a software application 134 may be designed by the software engineers of an application operator 120 with various content and features. The marketers, sales, or customer service employees in the application 134 may use the portal 400 to design an in-application user interface that will be rendered in the software application 134 during the runtime of the application 134 without further requiring the application 134 to be reinstalled or updated to a newer version. The content designed by the marketers will be rendered in the native code and can be personalized, targeted to different segments of end users, and dynamically delivered based on various triggers. As such, end users, even though they are using the same version of the software application 134 operated by the application operator 120, may have different in-application experiences based on various in-application user interfaces designed at the portal 400 and dynamically delivered to the end users. In some embodiments, the in-application user interface may be rendered in the native code (instead of being rendered using a web browser) through an SDK incorporated in the application 134 in a manner that will be discussed in further detail below, the end users may not notice the dynamic delivery of new content. This allows the transition in the entire in-application experiences to be seamless. In some embodiments, the portal 400 may provide a no-code or simple coding environment for various application operators 120 to design a user interface. Non-programmers, such as marketers, of the application operator 120 may create unlimited in-application content without having to ask for the software engineering team to update the code or the version of the software application 134. As such, the portal 400 provides enhanced flexibility for the application operator 120 to engage with its end users in a much lower cost compared to an often much-slower software application update cycles that often fail to provide individualized content.

The portal 400 may include one or more panels that provides various tools for application operator 120 to design an in-application user interface. The panels may include an UI object panel 410, a parameter panel 420, a view panel 430, and a simulation panel 440 that renders a simulation of the in-application user interface. The arrangements, sizes, orientations, and functionalities of the panels illustrated in FIG. 4 are examples only and may be changed in various embodiments and may also be customized by an application operator 120. A portal 400 in various embodiments may also include additional, fewer or different panels.

In some embodiments, the UI object panel 410 provides various options and selections of UI objects for an application operator 120 to design an in-application user interface that may include one or more pages. In the screen tab 412 (content of which not shown in FIG. 4), an application operator 120 may select when the in-application UI is a series of screens that are horizontally scrollable (e.g., an on-boarding message series), a series of screens that are vertically horizontally scrollable (e.g., a feed), a full screen interface that serves as another page of a software application 134, a pop-up (full screen or not), a modal that may be less than a full screen, or a embedded banner that may be used as a placeholder location for delivering dynamic or personalized content. While various types of in-application UIs, such as on-boarding message series, feed, pop-up, modal, embedded banner, are discussed as explicit examples, in various embodiments there can be other types of UIs. An application operator 120 may specify one or more types of the UIs and use the element tab 414 to design each screen in the selected UI.

The element tab 414 may provide various UI objects that allow an application operator 120 to design the layout, placement, multimedia content, types of UI objects, and functionality of a screen in the in-application UI. For example, the layout option provides selections of basic layout objects (e.g., container, grid, column, row) to an application operator 120 to divide the screen of an in-application UI into various sections. Function UI objects such as content, typography objects, buttons, and forms may be placed within a layout object. An application operator 120 may drag a layout object relative to another layout object to change the placement of various layout objects relative to each other. In some embodiments, the element tab 414 may display a preview of the designed message content while a user is selecting a design element. Further, the preview may also include a display with a series of designed pages, scenes.

Basic UI objects may include various common functional UI objects such as list, list items, link, and buttons. The UI object may be placed in one of the layout objects by a drag-and-drop action from the functional UI object to the location within the layout object. When an application operator 120 select one of the functional UI objects that is placed in the central panel, the application operator 120 may select further options for the functional UI object such as through a pop-up option screen (not shown) or through the parameter panel 420. For example, a link object or a button object may be connected to an external Uniform Resource Locator (URL), a deeplink to an external Uniform Resource Identifier (URI), or a deeplink to an internal location of the software application 134.

In some embodiments, the portal 400 may provide various advanced options to customize button objects. The portal 400 may allow a marketer of an application operator 120, without software engineer, to design a function UI in a no code or a simple code environment. An application operator 120 may specify the text on a button. The application operator 120 may also select advanced options such as button action of a button. The button action may specify how the software application 134 may react after an end user clicking the button. In some embodiments, the action may be executed by the SDK 136 that is incorporated in the software application 134.

In some embodiments, the actions may include an adaptive link, which may switch the user computing device 132 from the application 134 to a mobile wallet pass, such as a digital boarding pass, a digital credit card, and a coupon. In some embodiments, the actions may include launching an application rating page, which is a system prompt of the user computing device 132 for rating the software application 134. In some embodiments, the actions may include a deep link, which may open a configured screen within the software application 134 itself, the web, or another application 134. In some embodiments, the actions may include dismissing the message that is in the form of an in-application UI, without taking the user into the application 134. In some embodiments, the actions may include launching a preference center, which sends the end user to the preference setting of the application 134. In some embodiments, the actions may include going to the previous screen of the in-application UI, such as when the in-application UI is presented as a form of a series of messages. In some embodiments, the actions may include opening the system prompt for push notification opt-in. In some embodiments, the actions may include a share action, which prompts the end user to share the content in the in-application UI on one or more ways, such as copying the link, sharing on one or more social networks.

The element tab 414 may also include text objects such as headings and paragraphs and multimedia objects such as images and videos. The setting of a multimedia objects allows an application operator 120 to upload or link a multimedia file to the object location. The element tab 414 may also include form objects such as form blocks, inputs, text areas, and checkboxes. The text objects allow an application operator 120 to design an in-application survey forms and other interactive features such as live chat and feedback boxes. The element tab 414 may also include an interactive multimedia object for providing feedback score metrics (e.g., Net Promoter Score metrics).

The parameter panel 420 is a setting panel for a selected UI object, such as any objects presented in the user device 132. The parameters may include design parameters and property parameters. The design parameters may include parameters related to layouts, spacing, margins, padding, alignments, text, font size, text alignment, text style and color, opacity, and other appearance related parameters. A layout UI object may include parameters related to sizes, margins, spacing, alignments, etc. A function UI object that is placed within the layout UI object may also include its own design parameters including sizes, margins, spacing, alignments, etc.

In some embodiments, the types of property parameters may vary depending on the types of the functional UI objects. For example, settings for a button object and those for a multimedia object provide different customizations of the objects that are discussed above.

The view panel 430 and the simulation panel 440 provide simulations of how the in-application UI that is currently being designed will be rendered in a user computing device 132. The view panel 430 may provide selections of different views and screen resolutions of the simulation. For example, the view can be a portrait or a landscape view. The application operator 120 may also select the type of user computing device 132, such as a smartphone, a smartwatch, a tablet, etc. that is in either portrait or landscape mode. In some embodiments, the view panel 430 may also provide selections of screen resolution for a particular type of device, such as different screen sizes for various types of smartphones. The view panel 430 may also provide selections on whether the simulation should be rendered in a light screen mode or a dark screen mode.

The simulation panel 440 may take the form of the main view panel of the portal 400 and render a simulation of a user computing device 132 showing the in-application UI being designed. As different user computing devices 132 have different screen resolutions and run on different operating systems, the actual UI rendered may vary for the same set of UI objects and parameters. The simulation panel 440 provides simulations based on the selection of views from the view panel 430 so that an application operator 120 may examine different parameters to make sure the in-application UI is rendered properly in different environments. In some embodiments, the simulation panel 440 may provide drag-and-drop feature so that an application operator 120 may drag an UI object and drop it to the simulation panel 440 for placement and arrangement of the UI object.

In addition to the design configuration shown in FIG. 4, the portal 400 may also provide other configuration settings that are related to the overall triggering and targeting criteria of an in-application UI. For example, the portal 400 may provide trigger selections (not shown in FIG. 4) that is based on one or more trigger conditions that are available for selection. The trigger conditions are discussed and managed by various engines of the computing server 110, as discussed in the recipient management engine 210, the event management engine 215, the orchestration strategy management engine 220, the message series management engine 225, and the message campaign management engine 230. The trigger condition may also include nested conditions (e.g., in addition to a trigger defined for the entire in-application UI, an additional requirement that an end user is viewing a specific application screen) and deferred conditions (e.g., requiring a specific amount of time lapsed since a trigger event).

In some embodiments, the portal 400 may also provide audience selection, segmentation, and personalization of content based on audience. For example, an application operator 120 may specify that the in-application UI is to be sent to only a certain group of target audience. In some embodiment, the portal may include feature flags, a toggle to control the availability of content or functionality of the in-application UI. In some embodiments, the application operator 120 may design two or more versions of in-application UI and sent different versions to different segments of end users based on characteristics, actions, and other selection criteria of the users. The computing server 110, through the SDK 136 or another way, may receive a user identifier or device identifier and may personalize the content of the in-application UI. The portal 400 may also provide options for selection of audience of the software application version currently installed in the user computing device 132. Since some of the application features such as deeplinks on certain pages are only available on certain version number (or newer) of the software application 134, an application operator 120 may specify the software version that will receive the in-application UI payload.

Example Message and Event Sequences

Figure 5:
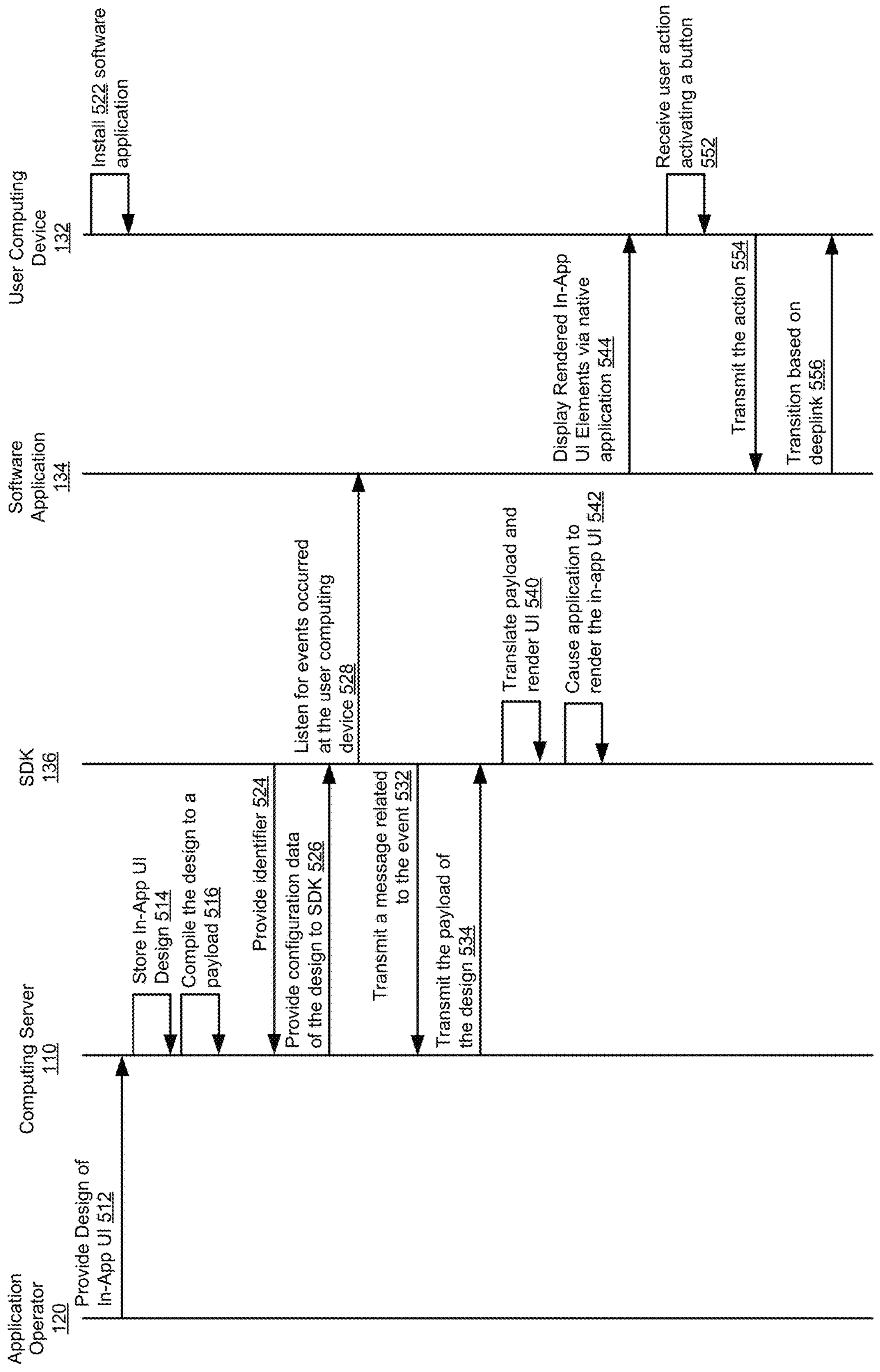
FIG. 5 is an example sequence diagram illustrating a sequence of interactions between entities of the system environment to design and deliver an in-application user interface, in accordance with some embodiments.

FIG. 5 is an example sequence diagram illustrating a sequence of interactions 500 between entities of the system environment 100 to design and deliver an in-application UI, in accordance with some embodiments. The sequence of interactions 500 illustrated in FIG. 5 may represent one or more sets of instructions that may be stored in a computer-readable medium, such as memory. The instructions, when executed by one or more processors of the depicted entities, cause the one or more processors to perform the described interactions. As depicted in FIG. 5, the sequence of interactions 500 may be performed by an application operator 120, the computing server 110, a user computing device 132 that is possessed by an end user, a software application 134 that is installed or to be installed in the user computing device 132, and the SDK 136 that is incorporated in the software application 134. The sequence of interactions 500 depicted in FIG. 5 is merely an example sequence of interactions, and in other embodiments the sequence of interactions may include fewer, additional, or different actions performed by the same or different entities. While the steps in the sequence of interactions 500 are illustrated as a series of steps, some of the steps may occur in different sequences than illustrated or may occur concurrently with other steps. Also, while the sequence of interactions 500 is depicted as a single series, in various embodiments and situations the sequence of interactions 500 may be further broken down into multiple sequences.

In some embodiments, the user 130 may provide 512 a design of an in-application user interface (UI) to the computing server 110. The in-application UI may be used for display by the software application 134 owned by the application operator 120. The design may be provided to the computing server 110 by different ways in various embodiments. For example, in some embodiments, the application operator 120 may provide a configuration file in the form of design code to the computing server 110. In some embodiments, the computing server 110 may provide a portal 400 for an application operator 120 to design the in-application UI. Detail of the functionalities and features of the portal 400 is discussed in FIG. 4. The portal 400 may take the form of a software-as-a-service (SaaS) platform that allows different application operators 120 to in-application UI respective for the software application of each application operator 120. The portal 400 may be a web platform that is rendered in a web browser of a computing device of the application operator 120. The design of an in-application UI may include layout information, functional objects settings and parameters, target audience selection criteria, trigger conditions, target software versions for delivery of the in-application UI, and other suitable parameters and settings. For example, the computing server 110 may receive, from the application operator 120, a trigger condition for displaying the in-application UI. The computing server 110 may store the in-application UI design in a data store, such as by associating the design with the identifier of the application operator 120 using the application operator management engine 205.

In some embodiments, the computing server 110 may compile 516 the design to a payload. The payload may be in a domain specific language that is translatable by the SDK 136 to the native code of the software application 134 to render the in-application UI. In some embodiments, the payload may include one or more UI objects that define the in-application UI and parameters of the UI objects. Examples of various UI objects, such as layout objects and functional objects, are discussed in association with FIG. 4. Based on the design, the computing server 110 may compile 516 those objects in a specific code format that can be rendered by application 134. In some embodiments, the UI objects and parameters may be arranged in key-value pairs and one or more objects may be arranged in a nested manner. For example, one or more functional objects may be put under the values of a larger object (e.g., a layout object) to indicate that the functional objects are to be placed within the layout element corresponding to the layout object. Examples of the code of a payload are illustrated in further detail in FIG. 6A and FIG. 6B.

In parallel, prior to, or subsequent to the design of the in-application UI, a user computing device 132 owned by end user may download and install 522 a software application 134 that is owned by the application operator 120. For example, the application operator 120 may be a business and the software application 134 may be the mobile app provided by the business. The application operator 120 may design the application 134 using the tools provided by the computing server 110. In some embodiments, the application 134 incorporates a software development kit (SDK) 136 provided by the computing server 110. The SDK may include an interface renderer that can render one or more code payload as an in-application user interface. For example, the interface renderer may include functionalities to recognize a domain specific language used in a payload and expand the key-value pairs of UI objects and parameters in rendering the user interface.

In some embodiments, the delivery of the in-application UI designed by the application operator 120 is conducted after the installation of the application 134 and during the runtime of the application 134. The user computing device 132 has the application 134 installed and running. As discussed in further detail below, in some embodiments, after the delivery and rendering of the in-application UI, the software version of the application 134 may remain unchanged and delivery of additional UI may not be considered as a software upgrade. As such, the delivery of the in-application UI allows an application operator 120 to provide dynamic, tailored and/or personalized in-application content and experience without having the end user to conduct application software update.

In some embodiments, after the software application 134 is installed, the incorporated SDK 136 may provide an identifier 524 to the computing server 110 to register the SDK 136 and/or the application 134 with the computing server 110 so that the computing server 110 is aware that the particular user computing device 132 is installed with the application 134. The identifier may take the form of the SDK identifier, the mobile device identifier, a cookie, or a set of identifiers, combined or individually, to provide sufficient indication to the computing server 110 to identify the instance of the application 134 installed at the particular user computing device 132. In some embodiments, in response, the computing server 110 may provide 526 some configuration data of the design of the in-application UI to the SDK 136. For example, the computing server 110 may provide the audience selection and trigger conditions to the SDK 136.

In some embodiments, the SDK 136 may listen 528 for events occurred at the user computing device 132, to the extent that is permissible by the end user. The events may be actions associated with the application 134, such as a mobile event, or any actions and events that are discussed in association with the event management engine 215 in FIG. 2. For example, the event may be an action associated with the end user that is performed in another channel, such as the user clicking a link included in a message sent to the end user from the computing server 110. In some cases, a mobile event may be an event that is triggered during runtime of the software application. In some embodiments, the SDK 136 may transmit 532 a message related to the event to the computing server 110. Depending on embodiments, the message may be triggered to be sent from the SDK 136 in various situations. For example, in some embodiments, the computing server 110, in providing 526 the configuration data related to the design of the in-application UI, may provide the trigger condition to the SDK 136. In turn, the SDK 136 may determine that the event occurred at the user computing device 132 meets the trigger condition and transmit 532 a message notifying the computing server 110 that the trigger condition has been satisfied. In some embodiments, whether the trigger condition is met may be determined by the computing server 110 and the SDK 136 simply transmits 532 a message that describes the event occurred to the computing server 110. Other types of messages may also be transmitted. In some embodiments, the message may be part of a series of messages between the computing server 110 and the SDK 136. The message may include a version identifier of the application 134 to provide an indication of the version of the software application 134. The version information may be used as an audience segmentation criterion or for a selection of design of an in-application UI to be delivered to the user computing device 132.

After the trigger condition is determined to be satisfied, whether by the computing server 110 or by the SDK 136, the computing server 110 may transmit 534 the payload of the design to the SDK 136 subsequent to the receipt of the message related to the event from the SDK 136. For example, the message related to the event from the SDK 136 may simply be a request for the payload of the in-application UI. The payload may be compiled by the computing server 110 based on the design of the in-application UI configured by the application operator 120.

In some embodiments, the SDK 136 may translate 540 the payload and render the in-application UI. For example, the received payload may be in a domain specific language that is translatable by the SDK 136 and may also be referred to as a code payload. The SDK 136 may include a UI renderer that compile the code in the payload into the native code of the software application 134. In turn, the SDK 136 may cause the software application 134 to render, based on the code in the payload, the in-application UI in a native code of the software application 134. The application 134 may display 544 the rendered in-application UI elements (e.g., various UI objects) via the native application at the user computing device 132. The rendering of the in-application UI and the storage of the payload association with the SDK 136 may occur during the runtime of the software application 134 (e.g., after the installation of the software application 134). In some embodiments, the display and the addition of the in-application UI may not be considered as a software update of the application 134 and does not change the software version of the application 134, such as in the versioning information as reflected in the operating system of the user computing device 132 or the Application store (App store) of the user computing device 132.

In some cases, the rendered in-application UI may include one or more buttons. One of the buttons may be linked to an original location in the software application 134. The original location may be a location that comes with the installation of the application 134 and is not part of the added in-application UI. For example, various original functional pages of the software application 134 may be tagged with different deeplinks. A button may be specified by the application operator 120 to be linked to a particular deeplink that will cause the application 134 to transition to one of the original page of the application 134. In some embodiments, the user computing device 132 may receive 552 a user action of activating the button and transmit 554 the action to the application 134. The application 134, based on the deeplink, may transition the software application 134 to a particular page that is an original location in the application.

Example In-Application UI Payload

FIGS. 6A and 6B are conceptual diagrams illustrating an example payload 600 that may be used to render an in-application user interface, in accordance with some embodiments. The payload 600 may be in a format of a domain specific language that is translatable by an SDK 136 to render an in-application UI. In some embodiments, a payload 600 may be in a format of a nested key value pairs that includes the UI objects and associates parameters of those UI objects.

By way of example, in some embodiments, the payload 600 may be group in a package of code the master key "presentation" with parameter values and UI objects as various values of the master key. The in-application UI may include one or more UI-level parameters that define the overall characters of the in-application UI. For example, the UI-level parameters may include a parameter that defines whether the in-application UI rendered will dismiss on touch outside of the area of the in-application UI. For example, the in-application UI may be defined as a pop-up modal that does not occupy the full screen of the application 134. The parameter may define that whether the pop-up modal should be dismissed if the end user clicks a background area outside of the in-application UI. Other examples of UI-level parameters may include a set of default placement parameters that define the overall placement of the in-application UI, a type parameter that defines the type of in-application UI, and version parameter.

Referring to FIG. 6B, the layouts and the functional UI objects within the in-application UI may be defined by a series of nested view parameters. Each view parameter may include key-value pairs that defines the types of UI objects, the layout parameters of the UI objects (e.g., positions, sizes, colors, etc.) and other parameters that define the functions of the UI objects. Those parameters may be designed and selected using the portal 400 and be compiled into the payload 600 by the computing server 110. Each UI object is placed into one or more nested "view" key-value pairs to define the layout and hierarchy of the UI object relative to other objects in the in-application UI. Based on these parameters and values, an SDK 136 may cause the application 134 to render the in-application UI in the native format of the application 134 without incorporate a separate viewer such as a web browser, which may have integration issues with the application 134.

Computing Machine Architecture

Figure 7:
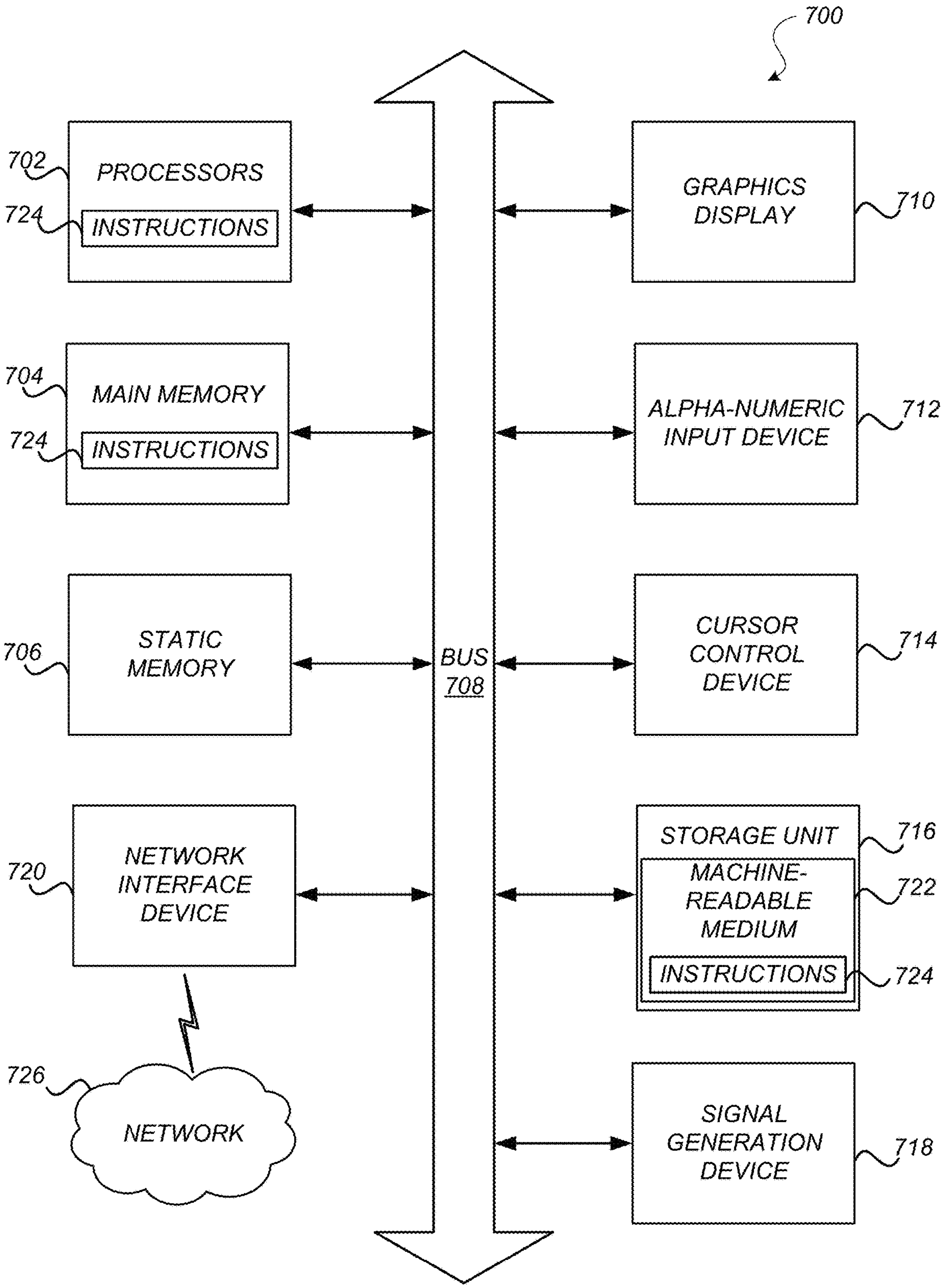
FIG. 7 is a block diagram illustrating components of an example computing machine, in accordance with some embodiments.

FIG. 7 is a block diagram illustrating components of an example computing machine that is capable of reading instructions from a computer-readable medium and execute them in a processor (or controller). A computer described herein may include a single computing machine shown in FIG. 7, a virtual machine, a distributed computing system that includes multiples nodes of computing machines shown in FIG. 7, or any other suitable arrangement of computing devices.

By way of example, FIG. 7 shows a diagrammatic representation of a computing machine in the example form of a computer system 700 within which instructions 724 (e.g., software, source code, program code, bytecode, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 7 may correspond to any software, hardware, or combined components shown in FIGS. 1 and 2, including but not limited to, the computing server 110, the user computing device 132 and various engines, interfaces, terminals, and machines shown in FIG. 2. While FIG. 7 shows various hardware and software elements, each of the components described in FIG. 1 or FIG. 2 may include additional or fewer elements. Further, the instructions may correspond to the functionality of components and interfaces described with FIGS. 1-6.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 724 that specify actions to be taken by that machine. Further, while only a single machine is illustrated, the term "machine" and "computer" may also be taken to include any collection of machines that individually or jointly execute instructions 724 to perform any one or more of the methodologies discussed herein.

The example computer system 700 includes one or more processors 702 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 700 may also include a memory 704 that store computer code including instructions 724 that may cause the processors 702 to perform certain actions when the instructions are executed, directly or indirectly by the processors 702. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 702 and reduces the space required for the memory 704. For example, the methods described herein reduce the complexity of the computation of the processors 702 by applying one or more novel techniques that simplify the steps in training, reaching convergence, and generating results of the processors 702. The algorithms described herein also reduces the size of the models and datasets to reduce the storage space requirement for memory 704.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 700 may include a main memory 704, and a static memory 706, which are configured to communicate with each other via a bus 708. The computer system 700 may further include a graphics display unit 710 (e.g., a plasma display panel (PDP), a liquid crystal display (LCD), a projector, or a cathode ray tube (CRT)). The graphics display unit 710, controlled by the processors 702, displays a GUI (GUI) to display one or more results and data generated by the processes described herein. The computer system 700 may also include an alphanumeric input device 712 (e.g., a keyboard), a cursor control device 714 (e.g., a mouse, a trackball, a joystick, a motion sensor, or another pointing instrument), a storage unit 716 (a hard drive, a solid state drive, a hybrid drive, a memory disk, etc.), a signal generation device 718 (e.g., a speaker), and a network interface device 720, which also are configured to communicate via the bus 708.

The storage unit 716 includes a computer-readable medium 722 on which is stored instructions 724 embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting computer-readable media. The instructions 724 may be transmitted or received over a network 726 via the network interface device 720.

While computer-readable medium 722 is shown in an example embodiment to be a single medium, the term "computer-readable medium" should be taken to include a single medium or multiple media (e.g., a centralized or distributed database, or associated caches and servers) able to store instructions (e.g., instructions 724). The computer-readable medium may include any medium that is capable of storing instructions (e.g., instructions 724) for execution by the processors (e.g., processors 702) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

Beneficially, a computing server provides a platform for various businesses to delegate the task of distributing messages and user interfaces to end users. Transmission of user interfaces, which is conventionally considered an update of an application, can be technically challenging for many organizations software updates are distributed in a limited way such as through Application Stores and require certain technical expertise. The Application Store may also impose various requirements. The use of SDK incorporated by an application and a payload format discussed in this disclosure allow in-application user interface to be rendered in a native code of the application without performing a software update. The architecture disclosed herein allows application operators to perform various tasks in an efficient manner, including A/B testing, in-application content rendering, targeted segmentation of user experience of mobile applications, delivery of personalized in-application content, and dynamic trigger of change of user interfaces.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A system comprising:

a computing server comprising one or more processors and memory storing computer code comprising instructions, wherein the instructions, when executed by the one or more processors, cause the one or more processors to:

receive, from an application operator, a design of an in-application user interface (UI) for display by a software application owned by the application operator;

receive, from the application operator, a trigger condition for displaying the in-application UI; and compile the design to a payload that includes (1) one or more UI objects that define the in-application user interface and (2) parameters of the UI objects; and a software development kit (SDK) incorporated in the software application as part of the software application, the software application developed by the application operator, and the SDK in communication with the computing server, wherein the SDK is configured to:

monitor an event associated with a computing device at which the software application is installed, wherein the event meets the trigger condition for displaying the in-application UI;

transmit a message related to the event to the computing server;

receive, subsequent to the message, the payload from the computing server; and cause the software application to render, based on the payload, the in-application UI in a native code of the software application.

2. The system of claim 1, wherein the computing server is configured to provide a portal that allows the application operator to create the design of the in-application UI.

3. The system of claim 1, wherein the trigger condition is a mobile event that is triggered during runtime of the software application.

4. The system of claim 1, wherein the payload arranges the parameters in key-value pairs and the UI objects are nested.

5. The system of claim 1, wherein the payload is in a domain specific language that is translatable by the SDK to the native code of the software application.

6. The system of claim 1, wherein the in-application UI comprises one or more buttons that are linked to an original location in the software application.

7. The system of claim 1, wherein the computing server is configured to provide a portal that is configured to render a plurality of simulations of the in-application UI in different screen resolutions.

8. The system of claim 1, wherein one of the parameters of the UI objects defines the in-application UI and is a full screen UI, a modal, an embedded banner, or a pop-up.

9. The system of claim 1, wherein the SDK comprises an interface renderer that renders the payload as the in-application UI.

10. The system of claim 1, wherein the computing server operates a software-as-a-service (SaaS) platform that allows a plurality of application operators to design a plurality of in-application user interfaces for software applications of the application operators.

11. A computer-implemented method comprising:

receiving, by a computing server from an application operator, a design of an in-application user interface (UI) for display by a software application owned by the application operator;

receiving, from the application operator, a trigger condition for displaying the in-application UI; and compiling the design to a payload that includes (1) one or more UI objects that define the in-application user interface and (2) parameters of the UI objects; and receiving, from a software development kit (SDK), a message related to an event, wherein the SDK is incorporated in the software application as part of the software application, the software application developed by the application operator, the SDK in communication with the computing server, wherein the SDK is configured to monitor the event associated with a computing device at which the software application is installed;

determining that the event meets the trigger condition for displaying the in-application UI; and transmitting, subsequent to the message, the payload to the SDK, wherein the SDK causes the software application to render, based on the payload, the in-application UI in a native code of the software application.

12. The computer-implemented method of claim 11, further comprising providing a portal that allows the application operator to create the design of the in-application UI.

13. The computer-implemented method of claim 11, wherein the trigger condition is a mobile event that is triggered during runtime of the software application.

14. The computer-implemented method of claim 11, wherein the payload arranges the parameters in key-value pairs and the UI objects are nested.

15. The computer-implemented method of claim 11, wherein the payload is in a domain specific language that is translatable by the SDK to the native code of the software application.

16. The computer-implemented method of claim 11, wherein the in-application UI comprises one or more buttons that are linked to an original location in the software application.

17. The computer-implemented method of claim 11, further comprising providing a portal that is configured to render a plurality of simulations of the in-application UI in different screen resolutions.

18. The computer-implemented method of claim 11, wherein one of the parameters of the UI objects defines the in-application UI and is a full screen UI, a modal, an embedded banner, or a pop-up.

19. The computer-implemented method of claim 11, wherein the SDK comprises an interface renderer that renders the payload as the in-application UI.

20. The computer-implemented method of claim 11, wherein the computing server operates a software-as-a-service (SaaS) platform that allows a plurality of application operators to design a plurality of in-application user interfaces for software applications of the application operators.

* * * * *